US011218364B2

(12) United States Patent
Shevade et al.

(10) Patent No.: US 11,218,364 B2
(45) Date of Patent: Jan. 4, 2022

(54) NETWORK-ACCESSIBLE COMPUTING SERVICE FOR MICRO VIRTUAL MACHINES

(71) Applicant: Amazon Technologies, Inc., Seattle, WA (US)

(72) Inventors: Upendra Bhalchandra Shevade, Washington, DC (US); Michael Brooke Furr, Washington, DC (US); Kevin P. Smith, Fairfax, VA (US); Diwakar Gupta, Seattle, WA (US); Anthony Nicholas Liguori, Bainbridge Island, WA (US); Nishant Mehta, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 325 days.

(21) Appl. No.: 16/017,886

(22) Filed: Jun. 25, 2018

(65) Prior Publication Data

US 2019/0392150 A1 Dec. 26, 2019

(51) Int. Cl.
*G06F 9/455* (2018.01)
*H04L 12/24* (2006.01)
(Continued)

(52) U.S. Cl.
CPC ...... *H04L 41/0806* (2013.01); *G06F 9/45558* (2013.01); *G06F 9/5077* (2013.01);
(Continued)

(58) Field of Classification Search
CPC ............. G06F 2209/509; G06F 9/5027; G06F 9/5033; G06F 9/5038; G06F 9/5044;
(Continued)

(56) References Cited

U.S. PATENT DOCUMENTS 6,539,433 B1 * 3/2003 Tominaga ............ G05B 19/042
709/202
7,484,091 B2 1/2009 Bade et al.
(Continued)

FOREIGN PATENT DOCUMENTS

| EP | 1701259 | 9/2006 |
|---|---|---|
| EP | 2557498 | 2/2013 |
| WO | 2014116619 | 7/2014 |

OTHER PUBLICATIONS

M. Alfano; Network Management in Cloud computing for Public Administration: A Practical Use Case; 2014 IEEE (Year: 2014).*
(Continued)

Primary Examiner — Dong U Kim
(74) Attorney, Agent, or Firm — Robert C. Kowert; Kowert, Hood, Munyon, Rankin & Goetzel, P.C.

(57) ABSTRACT

An administrative agent running at a virtualization host of a network-accessible virtualized computing service determines that a first virtual machine is to be instantiated. The agent initiates at least a first configuration operation to enable connectivity for at least a portion of network traffic associated with the first virtual machine. The first configuration operation is performed at least in part using a first virtualization offloading card of the virtualization host. The agent causes a virtualization intermediary process of the virtualization host to launch one or more execution threads of the virtualization intermediary process to implement the first virtual machine. The intermediary process may be swapped to persistent storage, e.g., based on an analysis of resources of the virtualization host.

22 Claims, 19 Drawing Sheets

(51) Int. Cl.
  *G06F 9/50* (2006.01)
  *H04L 29/12* (2006.01)
(52) U.S. Cl.
  CPC ...... *H04L 61/2015* (2013.01); *H04L 61/2517* (2013.01); *G06F 2009/4557* (2013.01); *G06F 2009/45562* (2013.01); *G06F 2009/45583* (2013.01); *G06F 2009/45595* (2013.01)
(58) Field of Classification Search
  CPC .... G06F 9/505; G06F 9/5055; G06F 9/45558; G06F 9/5077; H04L 41/0806
  See application file for complete search history.

(56) References Cited

U.S. PATENT DOCUMENTS

| | | | |
|---|---|---|---|
| 7,996,836 | B1 | 8/2011 | McCorkendale et al. |
| 8,032,899 | B2 | 10/2011 | Archer et al. |
| 8,127,292 | B1 | 2/2012 | Dobrovolskiy et al. |
| 8,201,161 | B2 | 6/2012 | Challener et al. |
| 8,239,557 | B2 | 8/2012 | McCune et al. |
| 8,433,802 | B2 | 4/2013 | Head et al. |
| 8,514,868 | B2 | 8/2013 | Hill |
| 9,323,552 | B1 | 4/2016 | Adogla et al. |
| 9,361,145 | B1 | 6/2016 | Wilson et al. |
| 9,424,062 | B1* | 8/2016 | Mummidi ............ G06F 9/45558 |
| 9,804,865 | B2* | 10/2017 | Bookman ................. G06F 8/61 |
| 10,108,446 | B1* | 10/2018 | Steinberg ............ G06F 9/45558 |
| 2005/0251806 | A1 | 11/2005 | Auslander et al. |
| 2008/0244553 | A1 | 10/2008 | Cromer et al. |
| 2010/0070970 | A1 | 3/2010 | Hu et al. |
| 2011/0107331 | A1* | 5/2011 | Evans ..................... H04W 4/60 718/1 |
| 2011/0131443 | A1 | 6/2011 | Laor et al. |
| 2012/0227038 | A1* | 9/2012 | Hunt ................... G06F 9/45558 718/1 |
| 2012/0240110 | A1 | 9/2012 | Breitgand et al. |
| 2012/0250682 | A1* | 10/2012 | Vincent ................... H04L 45/74 370/390 |
| 2014/0351810 | A1* | 11/2014 | Pratt ................... G06F 9/45545 718/1 |
| 2016/0026573 | A1 | 1/2016 | Jacobs et al. |
| 2016/0077845 | A1 | 3/2016 | Earl et al. |
| 2016/0132351 | A1* | 5/2016 | Kashyap ................. G06F 21/53 718/1 |
| 2016/0170781 | A1* | 6/2016 | Liguori ............... G06F 9/45558 718/1 |
| 2017/0005918 | A1* | 1/2017 | Agarwal ............... H04L 69/325 |
| 2017/0076092 | A1* | 3/2017 | Kashyap ............... G06F 21/552 |
| 2018/0004539 | A1 | 1/2018 | Liguori et al. |
| 2018/0004954 | A1 | 1/2018 | Liguori et al. |
| 2018/0152503 | A1 | 5/2018 | Holgers et al. |
| 2019/0065267 | A1* | 2/2019 | van Riel ............. G06F 9/45558 |

OTHER PUBLICATIONS

"The Architecture of VMware ESXI" Retrieved from the Internet: URL:https://www.vmware.com/content/dam/digitalmarketing/vmware/en/pdf/techpaper/ESXiarchitecture.pdf, dated Aug. 9, 2019, pp. 1-10.
International Search Report and Written Opinion from PCT/US2019/036468, (Amazon Technologies, Inc.), dated Jun. 11, 2019, pp. 1-23.
U.S. Appl. No. 15/905,681, filed Feb. 26, 2018, Upendra Bhalchandra Shevade, et al.
U.S. Appl. No. 16/196,723, filed Nov. 20, 2018, Anthony Nicholas Liguori, etc.
U.S. Appl. No. 15/173,445, filed Jun. 3, 2016, Wilson, et al.
U.S. Appl. No. 14/869,907, filed Sep. 29, 2015, David Sean Russell.
U.S. Appl. No. 14/864,682, filed Sep. 24, 2015, Danilov, et al.
U.S. Appl. No. 14/535,056, filed Nov. 6, 2014, Potlapally, et al.
U.S. Appl. No. 15/199,489, filed Jun. 30, 2016, Liguori, et al.
U.S. Appl. No. 15/199,479, filed Jun. 30, 2016, Liguori, et al.
Zsgur Ulusoy, "Processing Real-Time Transactions in a Replicated Database System," 1994 Kluwer Academic Publishers, Boston, Revised Sep. 10, 1993, pp. 1-32.
Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994-2/13/04, pp. 85-98.
Scott Lystig Fritchie, "Chain Replication in Theory and in Practice," Erlang'10, Sep. 30, 2010, Baltimore, Maryland, USA. Copyright 2010 ACM 978-1-4503-0253-1/10/09, pp. 1-11.
Robbert van Renesse, et al, "Chain Replication for Supporting High Throughput and Availability," USENIX Association, OSDI 2004: 6th Symposium on Operating Systems Design and Implementation, pp. 91-104.
Philip A. Bernstein, et al, "Concurrency Control and Recovery in Database Systems," Addison-Wesley Publication Company, ISBN 0-201-10715-5, 1987, pp. 1-58.
From Wikipedia, the free encyclopedia, "Bromium," downloaded on Jun. 27, 2016 from https://en.wikipedia.org/wiki/Bromium, pp. 1-4.
Xen, "Dom0" downloaded Jun. 6, 2016 from http://wiki.xen.org/wiki/Dom0, last updated Mar. 29, 2015, pp. 1-2.
Amazon Web Services, "Amazon Elastic Compute Cloud: User Guide for Linux Instances," Latest Version update 2015, pp. 1-816.
IBM, General Information, Version 4, Release 3.0, Fifth Edition, Apr. 2002, pp. 1-101.
From Wikipedia, the free encyclopedia, "Hypervisor," downloaded Jun. 6, 2016 from https://en.wikipedia.org/wiki/Hypervisor, pp. 1-7.
Axel Buecker, et al., "Reduce Risk and Improve Security on IBM Mainframes: vol. 1 Architecture and Platform Security," Redbooks, IBM, Dec. 2014, pp. 1-308.
From Wikipedia, the free encyclopedia, "VMware ESX," downloaded Jun. 6, 2016 from https://en.wikipedia.org/wiki/VMware_ESX, pp. 1-13.
From Wikipedia, the free encyclopedia, "Xen," downloaded from Jun. 6, 2016 from https://en.wikipedia.org/wiki/Xen, pp. 1-12.
U.S. Appl. No. 15/236,116, filed Aug. 12, 2016, Konrad Jan Miller et al.
International Search Report and Written Opinion from PCT/US2017/040049, dated Sep. 13, 2017, Amazon Technologies, Inc., pp. 1-12.
Udo Steinberg, et al., "NOVA: A Microhypervisor-Based Secure Virtualization Architecture", ACM, EuroSys'10, Apr. 13-16, 2010, pp. 209-222.
Sangster, et al., TCG Published, Virtualized Trusted Platform Architecture Specification, Specification Version 1.0, Revision 0.26, Sep. 27, 2011, pp. 1-60.
Network Functions Virtualisation (NFV); NFV Security; Security and Trust Guidance, ETSI GS NFV-SEC 003, V1.1.2, downloaded by EP on Jun. 4, 2016, pp. 1-57.
U.S. Appl. No. 15/374,520, filed Dec. 9, 2016, Akhilesh Mritunjai.
International Search Report and Written Opinion from PCT/US2017/040066, dated Sep. 21, 2017, Amazon Technologies, Inc., pp. 1-11.
Cong Xu, et al., "vSlicer: Latency-Aware Virtual Machine Scheduling via Differentiated-Frequency CPU Slicing", Purdue University, Purdue e-Pubs, 2012, pp. 1-14.
International Search Report and Written Opinion from PCT/US2017/040076, dated Oct. 6, 2017, pp. 1-13.
Brendan Gregg's Blog "AWS EC2 Virtualization 2017: Introducing Nitro" Nov. 29, 2017, pp. 1-11.
Amazon Web Services, "Amazon Elastic Compute Cloud: User Guide for Linux Instances," Latest Version update 2018, pp. 1-884.
Amazon Web Services, "Amazon Elastic Container Service: Developer Guide" API Version, Nov. 13, 2014.
Amazon Web Services, "AWS Lambda: Developer Guide" 2018, pp. 1-539.
Aws, "Annoucing Amazon EC2 Bare Metal Instances (Preview)", Retrieved from URL: https://aws.amazon.com/about-aws/whats-new/2017/11/announcing-amazon-ec2-bare-metal-instances-preview/ on Jan. 15, 2018, pp. 1-4.

* cited by examiner

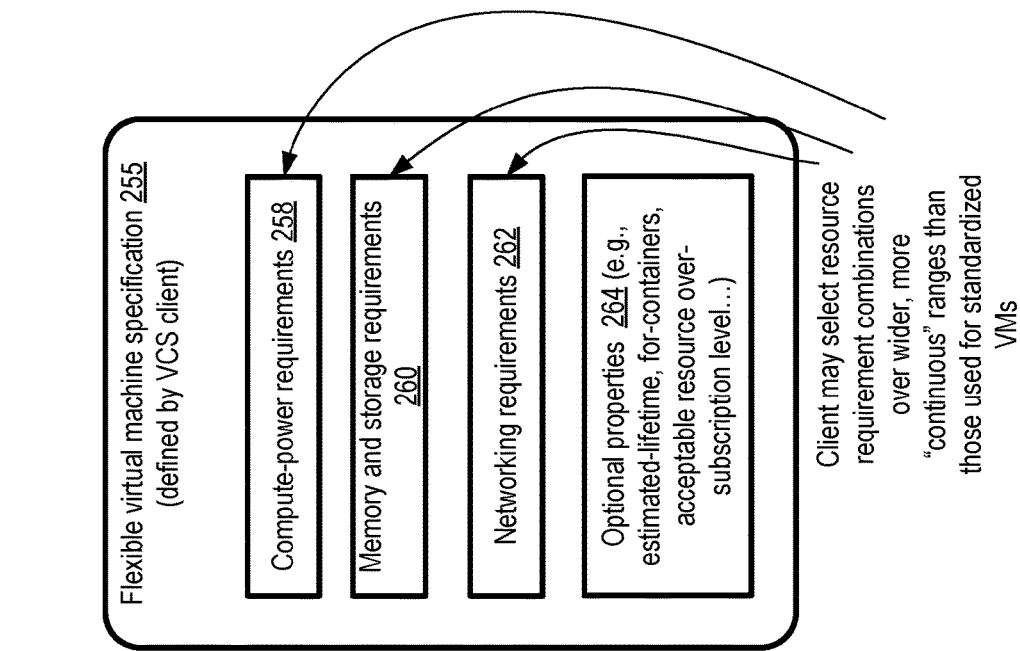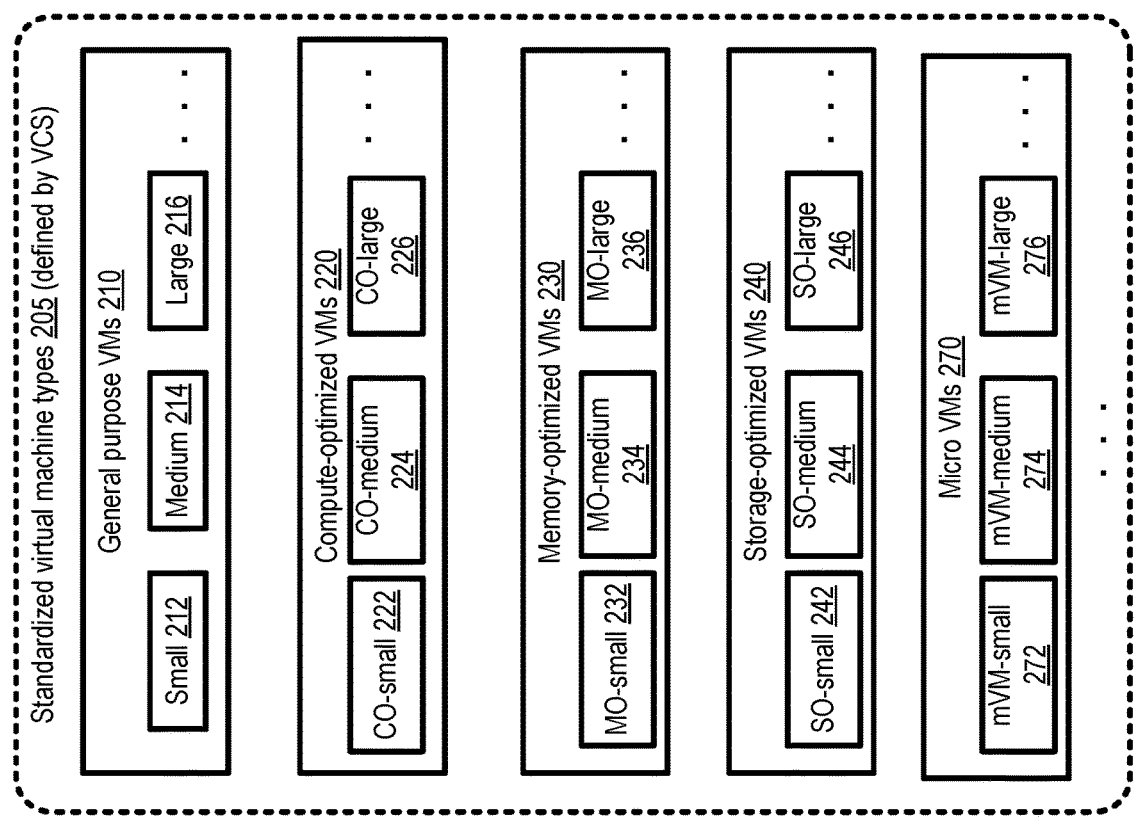
FIG. 2

After needed configuration operations are performed (e.g., in response to a single runVM request, or in response to separate reserveResources and runVM requests), a microVM (mVM1) is launched at a virtualization host with a virtualization offloading card, e.g., as a child thread of a virtualization intermediary process to which an API request is directed from a control plane administrative agent of a virtualized computing service  1801

↓

At least a portion of configuration information of mVM1 is saved as a snapshot, e.g., in response to a createVMSnapshot request  1804

↓

Optionally, additional preparatory configuration operation for clones of mVM1 are performed at one or more virtualization hosts  1807

↓

In response to a request to clone mVM1, a respective VIP process starts up a thread implementing the requested clone(s), e.g., using the snapshot and the results of the additional preparatory configuration operations  1810

*FIG. 18*

NETWORK-ACCESSIBLE COMPUTING SERVICE FOR MICRO VIRTUAL MACHINES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

A network-accessible service that provides virtualized computing functionality may have to manage hundreds of thousands, or even millions, of virtual machines concurrently. Some of the virtual machines, established for long-running client applications, may remain operational for weeks, months, or years, and may each consume a substantial amount of computing, memory and storage resources. Other virtual machines may be short-lived, e.g., lasting for just a few minutes or seconds to perform a specific task on behalf of a client, and may each consume a smaller amount of resources. The demand for different types of virtual machine may vary substantially over time. Designing a virtualization service that can efficiently handle large, dynamically changing mixes of virtual machines with widely differing functional and performance requirements remains a non-trivial technical challenge.

BRIEF DESCRIPTION OF DRAWINGS

FIG. 2 illustrates an example of a flexible virtual machine specification which may be provided by a client of a virtualized computing service which also supports a set of standardized virtual machine categories, according to at least some embodiments.

FIG. 18 is a flow diagram illustrating aspects of operations that may be performed at a virtualized computing service to clone micro virtual machines from snapshots, according to at least some embodiments.

Figure 1:
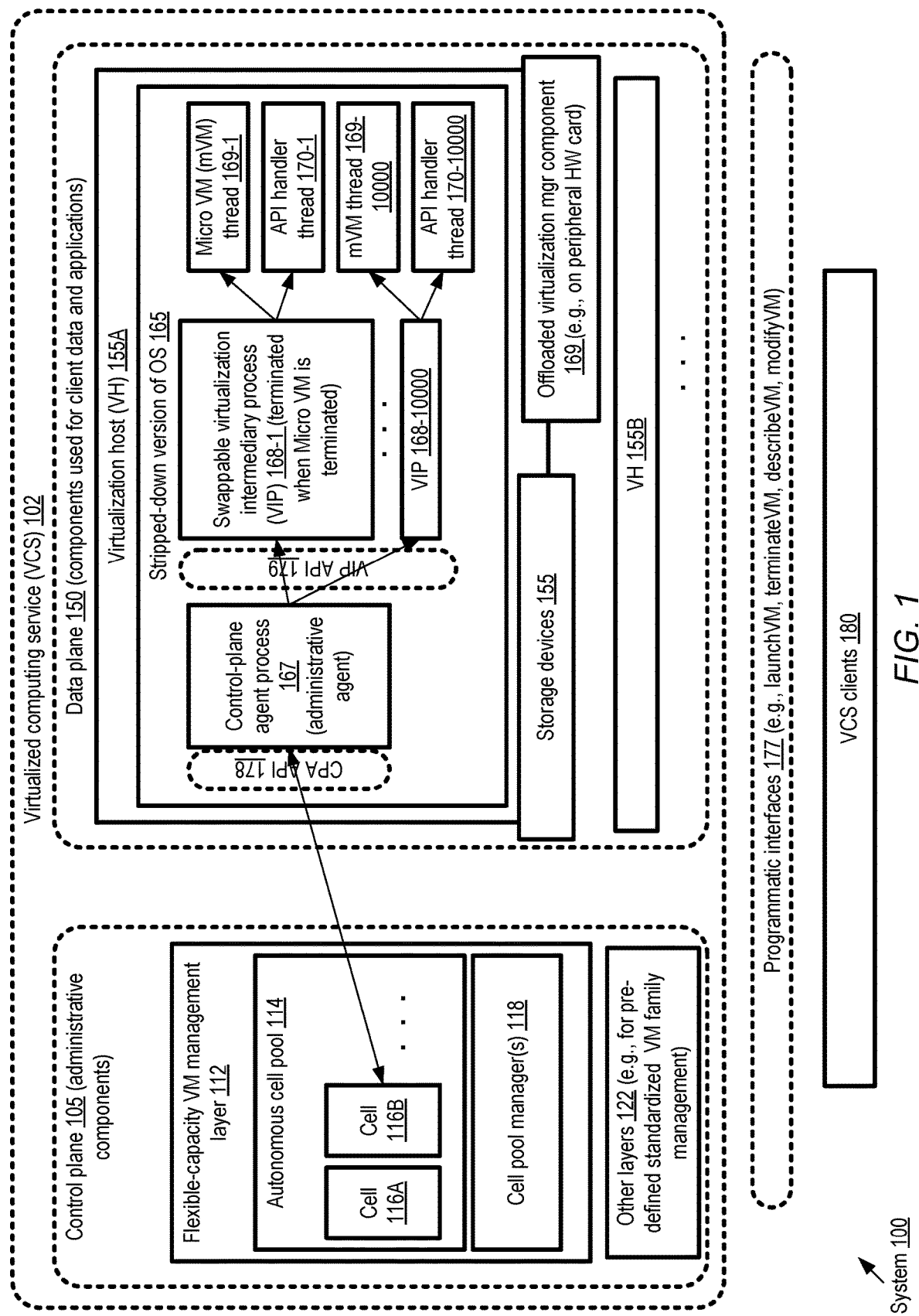
FIG. 1 illustrates an example system environment in which a virtualized computing service designed to support large numbers of virtual machines at individual virtualization hosts may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing a virtualized computing service (VCS) that can support the instantiation of large numbers (e.g., tens of thousands) of virtual machines on individual virtualization hosts are described. Note that virtualization management techniques similar to those described herein may of course also be used to support fewer virtual machine per host; in general, the techniques may allow substantial flexibility in the number and characteristics of virtual machines that can be supported on individual hosts. Some virtual machines may be referred to in various embodiments as "micro" virtual machines, as their respective resource requirements and/or expected lifetimes may lie below certain pre-selected thresholds, thus facilitating their instantiation at virtualization hosts whose hardware and software stacks are optimized for hosting thousands of small-resource-footprint virtual machines. As one skilled in the art will appreciate in light of this disclosure, certain embodiments may be capable of achieving various advantages, including some or all of the following: (a) reducing the overall amount of CPU, memory and storage resources that are utilized at a virtualized computing service to set up and run micro virtual machines while meeting customer-specified functionality and performance requirements, e.g., by using intelligent sharing and multiplexing of networking, storage and memory resources, (b) improving the overall responsiveness of a virtualized computing service with respect to virtual machine configuration requests, especially pertaining to short-lived or small-resource-footprint virtual machines, despite the potential variation of demand for virtual machines over time, and/or (c) enabling the virtualized computing service to fulfill virtual machine requests indicating arbitrary combinations of performance requirements (e.g., for processing power, memory, storage or networking).

The resources and artifacts of a network-accessible virtualized computing service may be logically subdivided into at least two high-level groups in various embodiments: a control plane and a data plane. The control plane may be used primarily for administrative operations, such as provisioning the hardware to be used for virtual machines, establishing and maintaining network connectivity, monitoring various components to ensure availability and failure resilience at desired levels, and so on. The data plane may be used primarily for running client applications on client-requested virtual machines, storing and transmitting client application data, and so on. In some embodiments, the control plane may be implemented primarily using one set of computing devices, while the data plane may be implemented primarily using a different set of computing devices, e.g., in an attempt to reduce the probability of failures in one plane from affecting the other. In at least some embodiments, a given computing device of a virtualized computing service may comprise components of both the control plane and the data plane—e.g., as discussed below in further detail, an agent of a control plane cell may run on a virtualization host at which a client-requested virtual machine is instantiated. In at least some embodiments, the VCS may be one among several network-accessible services implemented at a provider network or public cloud environment, and some virtual machines may be set up at the VCS on behalf of one or more of the other services. For example, a service that supports software container-based computing may utilize micro virtual machines of the VCS to set up software containers for its clients in one embodiment; such services may be referred to as intermediary services as they utilize the VCS on behalf of their own clients.

When requesting a virtual machine (VM), a client of a VCS may have to specify various performance-related characteristics of the requested VM. This may be done in a variety of ways in different embodiments. In some embodiments, a VCS may enable clients to select from among a discrete set of standardized pre-defined configurations when requesting a particular virtual machine. Each such pre-defined configuration may, for example, indicate a computing capacity (expressed, for example, in terms of virtual CPUs, where the definition of a virtual CPU may be specified by the VCS), a memory capacity, a storage capacity, a networking capacity, and the like. In other embodiments, a VCS may provide more flexibility with regard to virtual machine capabilities: e.g., a client may specify their own combination of performance requirements with respect to processing, memory, storage, networking and the like for a given set of one or more virtual machines. In at least some embodiments, both pre-defined virtual machine types and client-specified flexible-capacity virtual machines may be supported. Virtual machines whose capabilities are specified by clients, and do not necessarily correspond to pre-defined standardized configurations supported by the VCS, may be referred to as "flexible" or "flexible-capability" virtual machines in some embodiments. Virtual machines may also be referred to as "compute instances" in various embodiments. In some embodiments, as indicated earlier, virtual machines whose resource requirements (e.g., along one or more dimensions such as CPU, memory, storage, networking and the like) and/or whose lifetimes (duration between launch and termination of the virtual machine) are below thresholds defined by the VCS may be designated as micro VMs. In at least one embodiment, the VCS may pre-define a number of micro VM categories or types, while in other embodiments, a flexible-capacity VM whose resource requirements and/or expected lifetime fall below pre-selected thresholds may be classified as a micro VM—that is, the designation of a VM as a micro VM may be independent of whether the VM belongs to a pre-defined category or not. In one example scenario, if a particular type of hardware server is being used as a virtualization host for micro VMs, and the memory requirement of a particular VM is below (1/N) times the available physical memory of an individual hardware server of that type, where N is a parameter established by the VCS control plane, the VM may be considered a micro VM, and the VM may be classified as a non-micro VM otherwise. The resource or lifetime thresholds distinguishing a micro VM from non-micro VMs may change over time in various embodiments, e.g., as the resource capabilities of individual hosts increase.

According to at least some embodiments, a combination of software and hardware optimized for hosting large numbers of micro VMs may be used for at least a subset of virtualization hosts (which may also be referred to as "virtualization servers") of a VCS. In such embodiments, a virtualization host that is to be used for micro VMs may comprise one or more processors, a memory and one or more virtualization offloading cards. As indicated by the name, a virtualization offloading card may comprise a hardware card (with its own processors, firmware and/or software) that performs at least a subset of virtualization management functionality, thereby offloading or reducing the virtualization management workload of the primary processors (e.g., CPUs) and main memory of the virtualization host. Such cards may also be referred to as offloaded virtualization manager components (OVMCs) or OVMC cards in some embodiments. In one implementation, at least one virtualization offloading card may be attached to the host via a peripheral interconnect such as a PCI (Peripheral Component Interconnect) bus. A given virtualization host may comprise several different virtualization offloading cards in some embodiments—e.g., one may be used for offloading networking-related virtualization management tasks, another for offloading disk storage-related virtualization management tasks, etc.

The memory of a virtualization host may store program instructions to implement components of an optimized or stripped down version of an operating system in some embodiments, as well as a set of processes directly involved in instantiating virtual machines. In at least some embodiments, the memory may comprise instructions that when executed on the processors of the virtualization host cause an administrative agent of the VCS control plane to determine that a micro VM is to be instantiated at the virtualization host on behalf of a VCS client. The virtualization host may have been selected as the recipient of a request for the new VM (e.g., by a VCS control plane cell) based at least in part on a determination that the resource requirements of the requested VM are below a threshold used for classifying VMs as micro VMs. The administrative agent, which may be referred to as a control plane agent or CPA process in various embodiments, may serve as a local API (application programming interface) endpoint for the VCS control plane in some embodiments—e.g., the VCS control plane may communicate with the virtualization host, as and when needed, by invoking APIs implemented by the CPA, and the VCS control plane may not need to communicate directly with the micro VMs launched at the virtualization host in such embodiments. Operations that are to be performed at the virtualization host in response to control plane requests (e.g., launches/terminations of virtual machines, configuration changes to accommodate new virtual machines, etc.) may be initiated locally by the CPA process in at least some embodiments. The determination that the micro VM is to be instantiated may be made based at least in part on analyzing a request received at the agent process from a component of the VCS control plane (which may be running as part of a separate control plane cell as described below) in various embodiments. The control plane component may transmit such a request to the CPA in response to a request from a VCS client to launch a VM in various embodiments—that is a VM launch request may be directed from a VCS client to the VCS control plane component, and an internal version of the request may be directed from the VCS control plane component to a CPA at a selected virtualization host. In at least one embodiment, a resource requirement of the micro virtual machine to be launched (which, as indicated above, may meet a threshold criterion for designation of the requested virtual machine as a micro VM) may be indicated in the version of the request received by the CPA.

In response to receiving the request, a micro VM launch workflow may be initiated by the CPA in various embodiments. As part of the workflow, a copy of a machine image to be used for the micro VM may be generated or obtained, and one or more configuration operations for the micro VM may be initiated by the CPA in some embodiments. Depending on the type of micro VM requested and/or the identity of the requesting client, the set of configuration operations required may vary. In one embodiment, for example, a configuration operation to enable connectivity, using a particular virtualization offloading card, for administrative network traffic (e.g., traffic with the control plane of some service other than the VCS itself) associated with the micro VM may be initiated. In another embodiment, in addition to or instead of enabling connectivity for administrative traffic, a configuration operation to enable connectivity for non-administrative network traffic (e.g., traffic with compute instances or data-plane resources belonging to the same client on whose behalf the micro VM is being launched) may be initiated by the CPA. Configuration operations to configure storage devices for use by the micro VM may be initiated in some embodiments by the CPA.

After the CPA has performed its set of configuration operations to prepare the virtualization host for the new micro VM, in at least some embodiments, the CPA may issue a command, via a programmatic interface of a local virtualization intermediary process (VIP), to launch the micro VM. In at least some embodiments, the CPA may launch the VIP process, and the VIP process may create a new child thread implementing the micro VM. The command issued by the CPA to the VIP may, in some embodiments, indicate various properties of the micro VM and/or results of the preliminary configuration operations initiated by the CPA—e.g., the command may indicate resource requirements of the micro VM, the particular machine image to be used for the micro VM, and/or various configured objects (e.g., software network interface device objects) that the micro VM is to use. In some embodiments, after the micro VM is launched, it may perform various client-specified application tasks, communicating with other entities as needed using the virtualization offloading card(s) of the virtualization host. If and when a request to terminate the micro VM is received at the VCS control plane, in various embodiments a corresponding internal version may be sent to the CPA, and the VIP (including the child thread implementing the micro VM) may be terminated via an API command issued by the CPA to the VIP. In at least some embodiments, e.g., to further reduce the time taken to respond to requests to launch micro VMs, at least some configuration operations for micro VMs may be performed in a pre-staging or resource reservation step in advance of receiving the launch request. In at least one embodiment, in another approach intended to enhance the responsiveness of the VCS to micro VM launch requests, an existing micro VM may be cloned—e.g., a snapshot of the configuration of a running micro VM may be generated and stored, and used later to quickly start up a desired number of similarly-configured micro VMs or "clones". Additional details regarding these optimizations (the pre-staging methodology, and the cloning methodology) are provided below.

In some embodiments, the VCS may implement one or more types of virtual network interfaces (VNIs), enabling some networking-related attributes such as IP (Internet Protocol) addresses to be transferred relatively easily between virtual machines (e.g., including micro VMs) without necessarily reconfiguring physical network cards. Such attribute transfers may be accomplished, for example, by detaching a virtual network interface programmatically from one virtual machine or operating system instance and attaching it programmatically to another virtual machine or operating system instance. In some embodiments, VNIs may be set up in a multiplexed configuration, with some number of child (or "branch") VNIs being programmatically associated with a parent (or "trunk") VNI, such that the use of some software objects or resources may be shared among the child VNIs. For example, only a single PCI device object may be created and associated with the parent VNI at an operating system installed on the virtualization host in some embodiments, and the child VNIs may not require their own PCI devices. Such multiplexed VNI configurations may be especially beneficial for virtualization hosts at which numerous micro VMs are instantiated, as the total number of PCI device objects that can be created may be limited. According to some embodiments, a parent multiplexed VNI may be configured at the virtualization host (e.g., by the VCS control plane or by the CPA) prior to launching at least some micro VMs at the host. In such an embodiments, one of the configuration operations performed by the CPA when it receives a request to launch a micro VM may include programmatically attaching a child VNI (for use by the micro VM) to the parent VNI.

In some embodiments, multiple child VNIs of a parent VNI may be used for respective types of network traffic of the micro VM. For example, in some embodiments a micro VM may be set up on behalf of an intermediary network-accessible service other than the VCS itself such as a software container service (SCS) may use a micro VM for one or more software containers established on behalf of a client of the SCS. In such embodiments, the control plane of the intermediary service may have to communicate with the micro VM (e.g., with an SCS agent thread or process which is launched within the micro VM), and a special communication channel may be set up for such control plane or administrative traffic. In one such embodiment, a single child VNI at the virtualization host may be used, in conjunction with a Port Address Translation (PAT) algorithm, to support such administrative traffic for a number of micro VMs that are to communicate with the intermediary service's control plane. As discussed below in further detail, in some embodiments, a common networking namespace may be established for PAT with respect to such administrative traffic. As part of the configuration operations performed before a particular micro VM is launched, the CPA may configure a link level simulation device (also referred to as a tap device) associated with a bridge in the common PAT namespace for the micro VM. The bridge may be programmatically connected to the child VNI being shared for the administrative traffic of several micro VMs in various embodiments, and a DHCP (Dynamic Host Configuration Protocol) server process instantiated at the virtualization host may assign respective distinct network addresses to each of the micro VMs for their administrative traffic.

According to one embodiment, the VCS may establish isolated virtual networks (IVNs) on behalf of various clients and/or other network-accessible services such as the SCS mentioned above. An IVN may comprise a collection of computing and/or other resources in a logically isolated section of a provider network or cloud environment, and may in some cases be established at the request of a particular customer or client of the VCS of the provider network. The customer may be granted substantial control with respect to networking configuration for the devices included in an IVN set up on the customer's behalf in some embodiments. In some embodiments, for example, a customer may select the IP (Internet Protocol) address ranges to be used for VNIs to be attached to various ones of the customer's virtual machines (including for example micro VMs) in the IVN, manage the creation of subnets within the IVN, and/or the configuration of at least some types of routing metadata (e.g., including one or more route tables associated with respective subnets) for the IVN. In some embodiments, resources that are to be used to perform the operations of one or more other services (e.g., services that help provide secure connectivity to resources at client-owned or client-managed data centers outside the provider network, software container management services, file storage services, or database services) implemented at the provider network may also be organized in one or more IVNs. According to some embodiments, a request to launch a micro-VM may indicate one or more properties or settings of an IVN in which the requested micro VM is to be configured, such as the name/ID of the IVN itself, a subnet ID, one or more private or public IP addresses to be assigned to the micro VM within the range of IP addresses of the IVN, and the like. Based at least in part on one or more settings indicated in the request, the CPA may in some embodiments determine at least some networking properties of the micro VM, such as one or more network addresses, thereby enabling data-plane (non-administrative) network traffic to flow between the micro VM and various other resources (such as other micro VMs, or other compute instances) within the IVN. In some embodiments, a respective child VNI may be designated for such IVN data plane traffic per micro VM—that is, if a particular virtualization host comprises K micro VMs, K child VNIs may be configured for their data plane traffic. In other embodiments, a single child VNI may be assigned for data plane traffic of several different micro VMs, enabling even higher levels of scalability.

According to some embodiments, the CPA may configure local communication channels for messages between individual micro VMs launched at the host, which do not require the use of the virtualization offloading cards and/or networking resources external to the host itself. For example, for some applications, multiple collaborating micro VMs arranged in a logical pipeline or cluster configuration may be set up at a given virtualization host, and at least some of the messages exchanged among such micro VMs may be transmitted via message buffers or queues set up in the memory of the virtualization host.

In some embodiments, resources of the virtualization hosts may be over-subscribed—e.g., the total amount of memory expected to be used by the set of micro VMs launched at a given host may exceed the available memory at the host. Over-subscription policies may be implemented at the VCS, for example, based on an expectation that in practice, the actual amount of memory being consumed by the set of micro VMs at a host may often be less than the sum of the maxima of the memory usages of the micro VMs, and that many micro VMs may only exist for relatively short durations. In some embodiments, acceptable resource oversubscription settings may be indicated by clients of the VCS, e.g., in individual VM launch requests or more globally (e.g., a client may indicate that for all their micro VM requests, a 110% memory oversubscription level is acceptable, so that micro VMs whose combined memory usage is 110% of the available memory may be set up at the host being used for the client's micro VMs). In at least some embodiments, the virtualization intermediary process whose thread is used for a micro VM may be swappable—e.g., in response to detecting that the amount of memory available at the virtualization host is below a threshold, at least a portion of the memory being used for the micro VM may be swapped or written to persistent storage.

A number of different options may be supported with regard to the types of persistent storage that can be used by micro VMs in different embodiments. For example, a virtualization host's locally attached rotating disks and/or solid state drives, network-attachable block device volumes managed by the VCS, network-attachable block device volumes managed by a service other than the VCS, object storage devices enabling access to storage via a web services interface, and/or a combination of such device types may be used in various embodiments. The different options may offer different combinations of performance, availability, fault-tolerance/resilience, and security in various embodiments, and the appropriate combinations may be selected for a given micro VM based on the client's preferences and/or on the VCS's default settings for micro VM storage. In some embodiments, storage may be shared among micro VMs—e.g., a tiered storage system may be implemented at the virtualization host, with some storage sections or objects being shared among all the micro VMs, other sections being shared among sub-groups of micro VMs, and others sections being designated for exclusive use by individual micro VMs. In at least some embodiments, in order to help speed up micro VM launch times, portions of several different boot images corresponding to several categories of micro VMs may be cached at the virtualization host, with the CPA being responsible for retrieving the uncached portion (if any) needed to construct the full image to be used to launch a requested micro VM.

In some embodiments, one or more categories of compute instances supported by the VCS may not necessarily comprise full-fledged virtual machines as such. For example, in one embodiment, a "bare-metal" compute instance supported by the VCS may comprise various processes of an operating system that directly control at least a portion of the hardware of the host being used, without utilizing virtualization (although a small subset of the hardware functionality may be virtualized in some cases). In such an embodiment, a hypervisor or a special operating system dedicated to virtualization management may not be required. In other embodiments, at least some bare-metal compute instances may comprise a full-fledged virtual machine, with most or all hardware functionality being virtualized. Bare-metal compute instances may be instantiated at virtualization hosts in some embodiments, and then micro VMs may be launched within the bare-metal instances.

In some embodiments, the VCS control plane may comprise several layers. One layer of the VCS control plane may comprise a plurality of autonomous cells in various embodiments, with each cell responsible for administering a respective set of virtual machines without interacting with any other cell (at least during normal operation). Such a control plane layer may be referred to as a "cell-based" layer in various embodiments. As discussed below in further detail, in some embodiments a given cell may comprise a collection of interacting components including one or more request processing nodes, one or more reconciliation or anti-entropy nodes, a log-based persistent data store for storing state information, and metadata indicating a group of virtualization hosts used for the virtual machines managed using the cell. In one such embodiment, the cell-based layer may be used primarily for administering relatively small (in terms of resource requirements) and/or flexible virtual machines such as micro VMs. In other embodiments, the cell-based control plane layer may be used for additional types of virtual machines, including at least some standardized virtual machines supported by the VCS. In one embodiment, a cell-based control plane may be used for all virtual machines instantiated at the VCS. In some embodiments, the virtualization hosts being managed may be considered elements of the cell.

In at least one embodiment, a VCS control plane may comprise a layer which is intended primarily for administering pre-defined or standardized virtual machines, e.g., in addition to a cell-based layer used primarily for flexible virtual machines. In some embodiments, the administrative responsibilities of a multi-layer VCS control plane may be divided based primarily on virtual machine performance capabilities rather than flexibility. For example, in one such embodiment, virtual machines whose performance needs (e.g., with respect to some combination of processing, memory, storage, or networking) are less than a threshold may be managed by a cell-based layer of the control plane, regardless of whether the virtual machines are instances of pre-defined standardized categories or not, while other virtual machines may be managed using a different layer which does not comprise cells. In various embodiments, a VCS may also include other layers, such as a request routing layer (comprising one or more request routers responsible for receiving client requests for administering virtual machines, and directing them to the appropriate cell or other control plane component), a control plane management layer (which may for example include a cell pool manager responsible for configuring the cells, and/or other components for administering the control plane itself), and so on.

Example System Environment

FIG. 1 illustrates an example system environment in which a virtualized computing service designed to support large numbers of virtual machines at individual virtualization hosts may be implemented, according to at least some embodiments. As shown, system 100 may comprise resources and artifacts of a virtualized computing service (VCS) 102 in the depicted embodiment, which may be broadly divided into a control-plane 105 and a data plane 150. The data plane 150 may include a plurality of virtualization hosts 155, such as 155A and 155B. A given virtualization host such as 155A may comprise a stripped-down or minimized version of an operating system 165 within which various processes used to implement micro virtual machines may be instantiated, one or more offloaded virtualization manager components 169 and/or a set of storage devices 155 in the depicted embodiment. The control plane 105 may comprise a flexible-capacity virtual machine management layer 112 and one or more additional layers 122. The flexible-capacity virtual machine management layer 112 may comprise a pool 114 of autonomous control plane cells in the depicted embodiment, such as cells 116A and 116B, as well as one or more cell pool manager(s) 118 responsible for establishing the pool, adding new cells and/or decommissioning cells in various embodiments. The other layers 122 may, for example, include control plane components responsible for managing pre-defined standardized virtual machine families that are not classifiable as micro virtual machines in the depicted embodiment.

The VCS 102 may implement a set of programmatic interfaces 177, such as a set of APIs, a web-based console, command-line tools and the like which can be used by VCS clients to submit programmatic requests in the depicted embodiment. For example, in one embodiments, programmatic requests such as "launchVM" (to instantiate one or more virtual machines, some of which may be micro VMs), "terminateVM" (to end execution of one or more virtual machines), "describeVM" (to obtain status and/or other metadata pertaining to one or more virtual machines), and/or "modifyVM" (to change properties of an existing VM) may be submitted via interfaces 177 by VCS clients 180. Note that VCS clients may include components of other network-accessible services in some embodiments—e.g., a network-accessible service which sets up software containers may use the interfaces 177 to set up micro VMs within which containers may be established. Such other services which use VMs provided by the VCS to serve their own customers may be referred to in various embodiments as intermediary services. Individual users associated with customer accounts of the VCS may also or instead use programmatic interfaces 177 in various embodiments to establish and interact with VMs.

In at least some embodiments, a request to launch or instantiate a VM may be processed initially by a request handler layer (not shown in FIG. 1) of the control plane 105, and transmitted to a particular cell 116 such as cell 116B. The particular cell may be selected based on a variety of considerations, such as load balancing considerations, locality considerations and the like. The cell 116 may itself comprise a plurality of components as described below in further detail, including for example request processing nodes, reconciliation nodes, and a high performance data store instance. One of the components of the cell 116B may transmit an internal version of the request to launch the requested VM to a control plane agent (CPA) process running within an operating system 165 of a selected virtualization host 155A in the depicted embodiment. In some embodiments, a request may be directed to a CPA 167 only if the resource requirements of the requested VM are small enough for it to be characterized as a micro VM; if the resource requirements exceed a threshold, a different type of virtualization host (not shown in FIG. 1) dedicated to supporting larger VMs may be selected. In at least one embodiment, the cell component may start up a control plane agent process if one is not yet up and running at the selected virtualization host. A number of VM placement factors may be taken into account when selecting the particular VH 155 to be used in different embodiments—e.g., the number of VMs currently running on the host may be considered, the mix of resource usage characteristics of the VMs running on the host may be considered, the over-subscription settings of the VH 155 and/or the over-subscription preferences of the client on whose behalf the VM is to be launched may be considered, and so on. In some embodiments, components of the control plane 105 may perform some preliminary configuration operations on the VH 155 before any requests for specific VM launches are sent to a CPA 167 at the host—e.g., a multiplexed parent VNI may be configured as discussed below in further detail. The CPA may implement an internal set of application programming interfaces, referred to as a CPA API 178, in the depicted embodiment, which may be used for communication with the VCS control plane. In effect, the CPA API 178 may represent a contract governing the types of operations that are to be implemented at a VH 155 at the request of the VCS control plane, regardless of the specific implementation details of the CPA or other components of the VH 155.

Based at least in part on the request received from the control plane cell 116, the CPA 167 may identify various characteristics of a desired micro VM, including for example its targeted resource usage mix, networking connectivity requirements and the like in the depicted embodiment. In some embodiments, a number of different boot images for micro VMs may be available at the VCS, and the CPA may create or obtain a local boot image to be used for the requested micro VM. To prepare for the launch of a specific requested micro VM, the CPA may perform one or more additional configuration operations in some embodiments, such as configuring one or more child or branch virtual network interfaces (VNIs) associated with a parent or trunk VNI established earlier at the virtualization host using the offloaded virtualization manager component(s) 169. In at least one embodiment, separate channels involving distinct child VNIs may be set up for administrative or control plane traffic of the micro VM (e.g., traffic between the micro-VM and control plane components of an intermediary software container service of the kind discussed above), and for non-administrative or data-plane traffic (e.g., messages between the micro VM and other micro VMs or larger VMs set up on behalf of the client within an isolated virtual network). The CPA 167 may also perform storage setup operations for the micro VM to be launched in some embodiments, e.g., by creating, configuring and/or verifying storage objects that will be used by the micro VM.

After the CPA 167 has initiated, and/or verified the successful completion of, one or more configuration operations for the requested micro VM, in some embodiments the CPA 167 may launch a swappable virtualization intermediary process (VIP) such as VIP168-1. Initially, in the depicted embodiment, the VIP process 168-1 may comprise an API handler thread 170-1, which is configured to receive API requests or commands issued by the CPA 167. The CPA 167 may then issue a command to actually launch the micro VM, and a new child thread 169-1 of the VIP 168-1 may be launched to implement the requested micro VM. The command that results in the launching of the micro VM thread 169-1 may include parameters indicating for example the bootable machine image to be used, the resource requirements for the micro VM, the results of the configuration operations performed by the CPA specifically for the micro VM, and so on. The command to instantiate a micro VM may be submitted via a second internal API of the VCS, referred to as the VIP API 179 in the depicted embodiment. Just as the CPA API represented a contract between the VCS control plane and the CPA, in various embodiments, the VIP API may represent another contract indicating the types of requests that are to be processed by an entity that is responsible for launching and terminating micro VMs with a particular range of isolation and performance requirements, regardless of the specific implementation details or process/thread structure of the entity (e.g., the VIP).

As new requests for micro VMs are received at the CPA 167, the CPA workflow indicated above with respect to the launch of the micro VM thread 169-1 may be repeated in the depicted embodiment—e.g., micro VM specific configuration operations may be performed by the CPA prior to launching a VIP, and one of the threads of the VIP may be used for the requested micro VM. As suggested by the label VIP 168-10000, a large number (e.g., tens of thousands) of micro VMs may be created at a given host 155 in the depicted embodiment. Note that the actual number of micro VMs that can be instantiated to run concurrently at a host 155 may differ in different embodiments, depending for example on the overall resource mix available at the host, the version of the software/hardware stack installed, the resource oversubscription policy/policies in effect, and so on, and may be larger or smaller than the 10000 number shown in FIG. 1 by way of example. Because the parent VIP 168-1 of the micro VM 169-1 is swappable, it may be possible to implement desired levels of resource oversubscription in the depicted embodiment at VH 155A—e.g., the total memory usage of the set of micro VMs running at the VH 155A may exceed the amount of memory available. When a request to terminate a micro VM is received at the VCS control plane, a corresponding message may be transmitted via an API invocation to the CPA, and the VIP whose thread is used for the targeted micro VM may be terminated in the depicted embodiment. That is, in at least one embodiment, there may be a 1-to-1 relationship between the number of running micro VMs and the number of running VIPs. In other embodiments, a variation of the process architecture shown in FIG. 1 may be employed—e.g., a given VIP may spawn multiple micro VMs as respective threads, multiple CPAs may be set up at the VH, and so on. In some embodiments the VIP and/or a separate process used for a micro VM may not be swappable. As described below in further detail, e.g., in the context of FIG. 17, in some embodiments one or more types of resources may be pre-provisioned or reserved for micro VMs, thereby further reducing the time taken to respond to requests to launch micro VMs. In at least one embodiment, in another type of optimization as discussed in the context of FIG. 18, snapshots of micro VMs that have been launched may be generated and stored, and such snapshots may be employed to quickly launch cloned versions of the micro VMs (i.e., similarly-configured micro VMs may be configured quickly using the saved configuration settings etc. in the snapshots).

Example Virtual Machine Categories

FIG. 2 illustrates an example of a flexible virtual machine specification which may be provided by a client of a virtualized computing service which also supports a set of standardized virtual machine categories, according to at least some embodiments. When requesting the instantiation of one or more virtual machines, a VCS client may either select from among the standardized virtual machine types 205 defined by the VCS in the depicted embodiment, or provide one or more flexible VM specifications 255 to the VCS. The flexible specifications may be used for requesting at least some micro VMs in some embodiments (although as discussed below, a pre-defined family of micro VMs may also be supported in the depicted embodiment).

The standardized set of virtual machine types may be subdivided into families, such as a general-purpose VMs family 210, a compute-optimized VMs family 220, a memory-optimized VMs category 230, a storage-optimized VMs family 240, and so on in some embodiments. Depending on the estimated needs of the application for which a given VM is to be used by the client, a VM type from the appropriate family may be selected. The relative resource capabilities for the different VM types may be expressed using units selected or defined by the VCS—e.g., for computing, units such as virtual CPUs that are roughly performance-equivalent to a particular well known processor running at a particular clock speed may be defined. The family may be selected based on qualitative considerations (e.g., is the application mix more memory-intensive or more compute-intensive?), while the particular VM type within the family (e.g., small 212 vs. medium 214 vs. large 216 in the general purpose family) may be selected based on considerations such as desired performance levels, cost, and so on. Compute-optimized VMs 220, such as CO-small VMs 222, CO-medium VMs 224, or CO-large VMs 226 may, for example, be implemented using hosts with more and/or faster processors or cores than the general purpose VMs in the depicted embodiment. In the memory-optimized VMs 230 such as MO-small VMs 232, MO-medium VMs 234, or MO-large VMs 236, the amount of memory (e.g., the number of gigabytes of memory per virtual CPU) relative to the computing capability may be higher than in compute-optimized VMs 220 or the general-purpose VMs. Similarly, in the storage optimized family 240 comprising SO-small VMs 242, SO-medium VMs 244, and SO-large VMs 246, the ratio of local storage to compute power (e.g., number of gigabytes of local solid-state device (SSD) storage per virtual CPU) may be higher than in the other families. In the depicted embodiment, a predefined family 270 of micro VMs, each of which may qualify as a micro VM based on its overall resource requirements, may also be supported. An mVM-small category 272, mVM-medium category 274, and/or an mVM-large category 276 may be included in the micro VM family as shown.

Even though a wide range of resource capacities may be covered by the different pre-defined or standardized VM types, some clients may require VMs whose combination of resource capabilities does not match well to any of the standardized types. Accordingly, in some embodiments, such clients may provide their own specifications 255, indicating (in units interpretable by the VCS) their particular combinations of compute-power requirements 258, memory and storage requirements 260, networking requirements 262, and/or a set of optional properties 264. Optional properties 264 may, for example, indicate an estimated lifetime (e.g., N minutes) of a requested VM, an intended type of use of the VM (e.g., for setting up software containers), acceptable resource over-commitment levels with respect to the host at which the VM is to be launched, and the like in the depicted embodiment. In various embodiments, clients may use specifications 255 to select resource requirement combinations over wider, more "continuous" ranges than those chosen for standardized VMs. For example, among the memory and storage combinations offered in the standardized VMs, combinations such as (64 GB memory, 1TB local SSD storage) and (128 GB memory, 2TB local SSD storage) may be offered, but a client may specify a VM with the combination requirement (96 GB memory, 1.5 TB storage) or the like. Micro VMs may also be requested using flexible specifications 255 in some embodiments. From the perspective of the VCS provider, enabling clients to specify VM requirements using such continuous ranges over different performance dimensions may have the additional benefit in various embodiments that it may become possible to increase hardware oversubscription levels (and/or overall hardware resource utilization levels) without affecting responsiveness. Given the same set of virtualization hosts, it may, depending on the mix of concurrent or near-concurrent VM requests, be possible to "fit" more virtual machines in total on the set of hosts than would have been possible if only discrete standardized VMs were supported. For example, in a scenario where some flexible VM requests need much more storage relative to computing power, while other near-concurrent flexible VM requests need much less storage relative to computing power, a cell-based control plane of the VCS may allocate resources from the same host for both groups of flexible VMs in some embodiments, with no negative impact on the perceived performance of either group.

The particular resource thresholds that result in the designation of a VM as a micro VM may differ in different embodiments, and may for example be expressed as one or more multi-dimensional tuples with respective entries for CPU resources, memory resources, networking resources and the like. For example, two different tuples T1 and T2 may be defined for micro VMs, with different combinations of thresholds (e.g., with the CPU threshold indicated in T1 being higher than the CPU threshold in T2, and the memory threshold in T2 being higher than the memory threshold in T1).

Micro VM Connectivity Needs

Figure 3A:
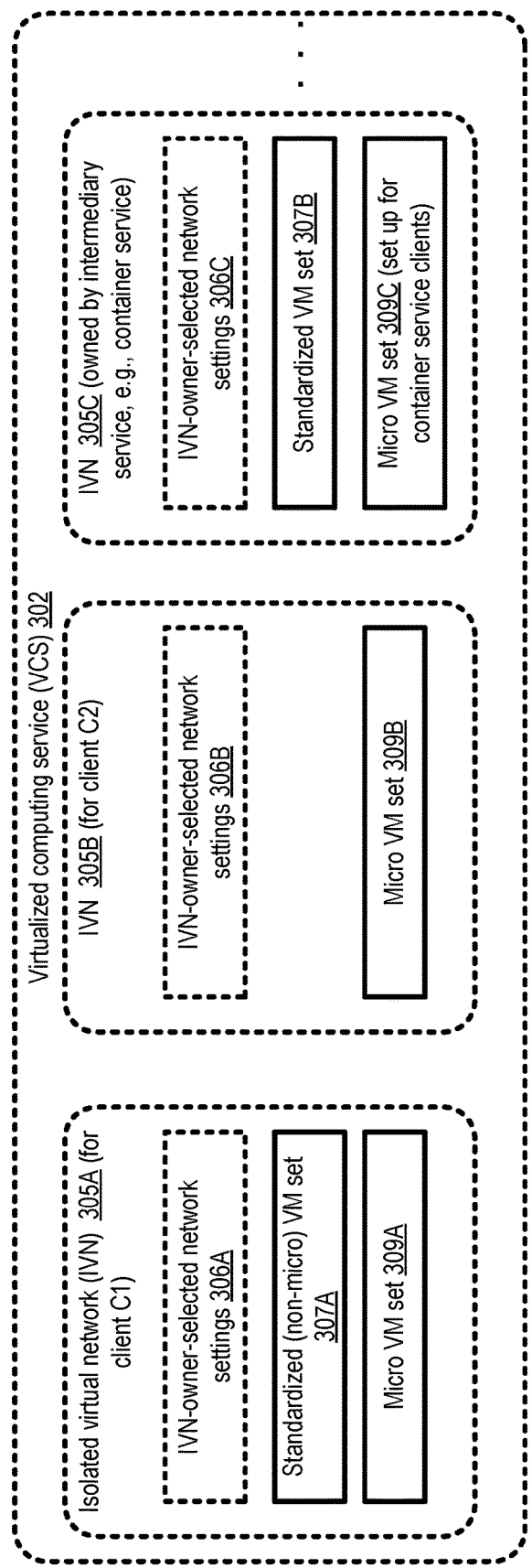
FIG. 3a illustrates example isolated virtual networks that may be established on behalf of clients of a virtualized computing service, according to at least some embodiments.

As mentioned earlier, in some embodiments the virtual machines and other resources of a VCS may be organized into logically distinct isolated virtual networks (IVNs), and the networking configuration requirements for a given micro VM may depend on the configurations of the IVNs set up on behalf of the client (or intermediary service) that requested the micro VM. FIG. 3a illustrates example isolated virtual networks that may be established on behalf of clients of a virtualized computing service, according to at least some embodiments. An IVN may comprise a collection of computing and/or other resources in a logically isolated section of a provider network or cloud environment. The entity on whose behalf the IVN is created may be granted substantial control with respect to networking configuration for the devices included in the IVN in various embodiments. In some embodiments, for example, a customer may select the IP (Internet Protocol) address ranges to be used for VNIs to be attached to various ones of the customer's virtual machines (including for example micro VMs) in the IVN, manage the creation of subnets within the IVN, and/or the configuration of at least some types of routing metadata (e.g., including one or more route tables associated with respective subnets) for the IVN. In some embodiments, resources that are to be used to perform the operations of one or more other services (e.g., services that help provide secure connectivity to resources at client-owned or client-managed data centers outside the provider network, software container services, file storage services, or database services) implemented at the provider network may also be organized in one or more IVNs.

In FIG. 3a, three IVNs 305A, 305B and 305C are shown by way of example. IVN 305A is established on behalf of a client C1 of the VCS, and has a set of owner-selected networking settings 306A applicable to (a) a set 307A of standardized (non-micro) virtual machines and (b) a set 309A of micro VMs. IVN 305B, established on behalf of a client C2, includes a set of micro VMs 309B and associated settings 306B; IVN 305B does not include any standardized non-micro VMs. IVN 305C may have been established on behalf of another network-accessible service (termed an intermediary service) in the depicted embodiment, such as a software container service. IVN 305C may include some number of standardized VMs of set 307B, as well as a set of micro-VMs 309C set up for the containers of clients of the container service. For example, one or more software containers may be established within a given micro-VM of set 309C. Network settings 306C for IVN 305C may be selected by the intermediary service in the depicted embodiment. Some IVNs (not shown in FIG. 3a) may not include any micro VMs in various embodiments.

Figure 3B:
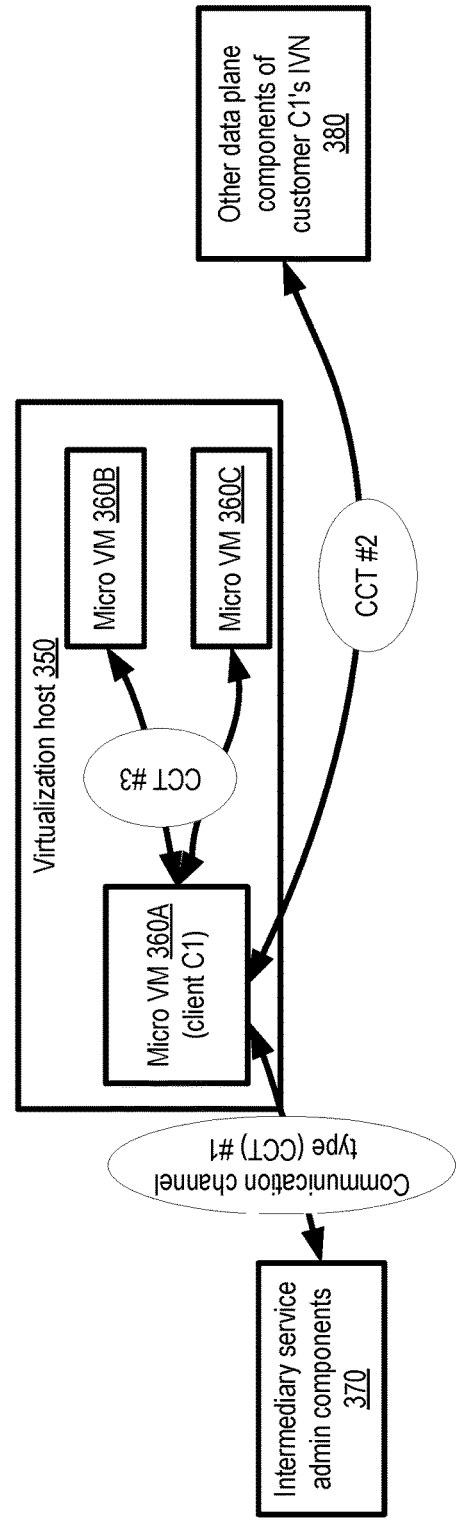
FIG. 3b illustrates three types of communication channels that may be set up for micro virtual machines, according to at least some embodiments.

FIG. 3b illustrates three types of communication channels that may be set up for micro virtual machines, according to at least some embodiments. In the depicted embodiment, micro VMs 360A, 360B and 360C have been established at a virtualization host 350 (similar in features and capabilities to virtualization hosts 155 of FIG. 1). At least micro VM 360A has been established on behalf of a particular customer or client C1, e.g., by an intermediary service such as a software container service or by C1. The micro VM 360A may run applications, one or more software containers, and/or an operating system that is to communicate with three types of entities, and may therefore need three types of networking configuration or channel setup in the depicted embodiment.

To exchange messages with administration or control plane components 370 of an intermediary service, a communication channel designated as type CCT #1 may be established for micro VM 360A in the depicted embodiment. For data-plane traffic exchanged with other entities (such as other micro or non-micro VMs instantiated at other hosts) within one or more IVNs, a channel of type CCT #2 may be established in some embodiments. Finally, for intra-virtualization-host network traffic with other micro VMs such as 360B and 360C, a third type of channel designated as type CCT #3 may be used in at least some embodiments. As described below in further detail, multiplexed virtual network interfaces may be employed for CCT #1 and CCT #2 in at least some embodiments.

Virtual Network Interfaces for Micro VMs

Figure 4:
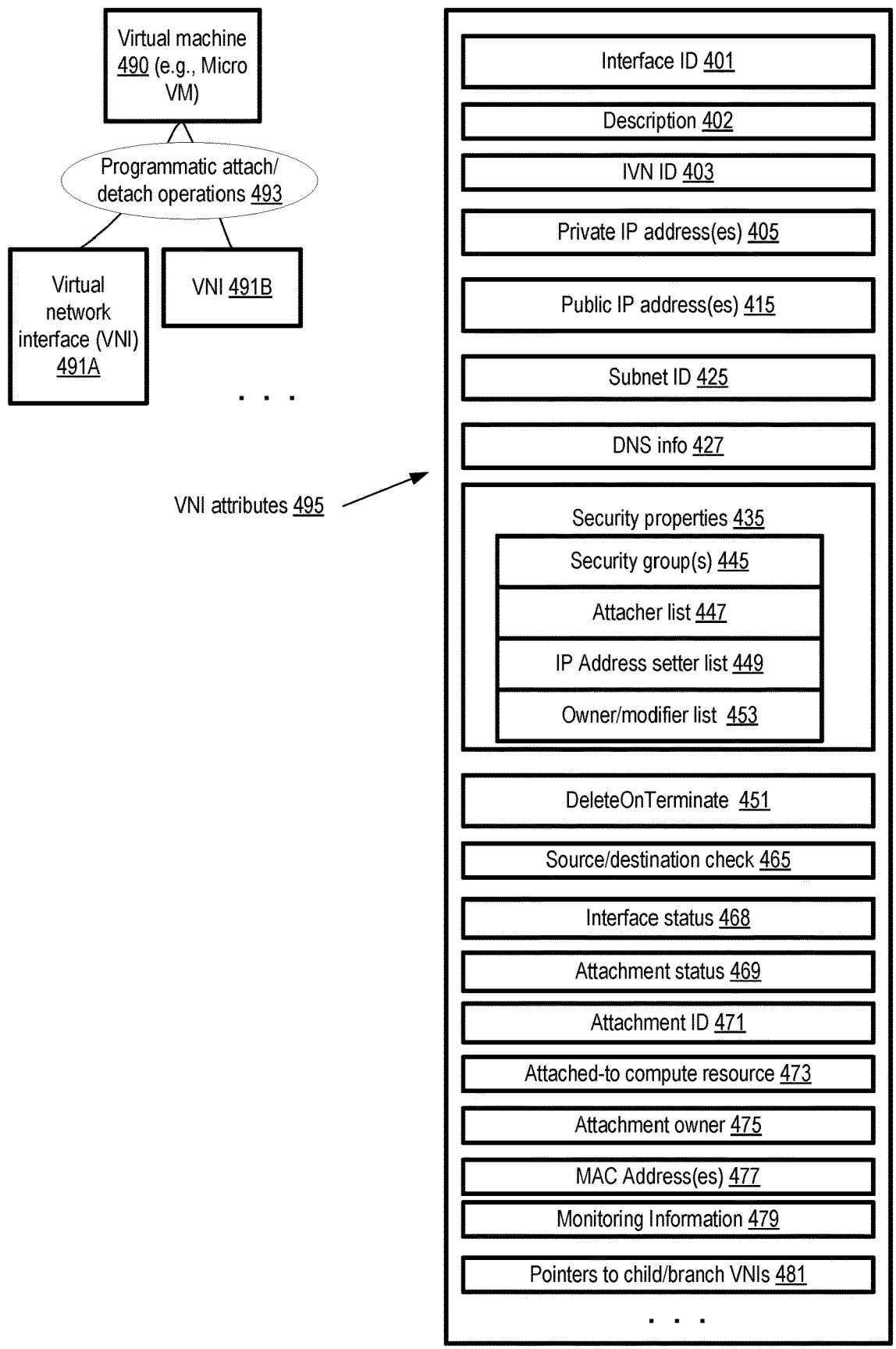
FIG. 4 illustrates examples of attributes of virtual network interfaces that may be configured for micro virtual machines, according to at least some embodiments.

In various embodiments, virtual network interfaces (VNIs) (which may also be referred to as "elastic network interfaces") may be configured at a VCS, enabling some networking-related attributes such as IP (Internet Protocol) addresses to be transferred relatively easily between virtual machines without necessarily reconfiguring physical network cards. Such attribute transfers may be accomplished, for example, by detaching a virtual network interface programmatically from one virtual machine and attaching it programmatically to another virtual machine. FIG. 4 illustrates examples of attributes of virtual network interfaces that may be configured for micro virtual machines, according to at least some embodiments. As shown, one or more VNIs such as 491A or 491B may be attached to (or detached from) a given virtual machine 490 via programmatic operations 493, independently for example of the specific hardware network interface cards (NICs) of the host at which the virtual machine runs in the depicted embodiment.

A generalized list of example attributes 495 of any given VNI 491 is shown in FIG. 4, not all of which may necessarily be used for all VNIs in at least some embodiments. Only a subset of the attributes or properties shown in FIG. 4 may be implemented in some embodiments, and not all the implemented attribute fields may have to be populated (i.e., some of the attributes may be left blank or null). Respective records comprising fields/entries containing the attributes 495 of various VNIs may be stored in a persistent metadata store in some embodiments, e.g., a store that is accessible from various control-plane or administrative components of the provider network or the VCS.

When a new VNI is created, e.g., in response to a programmatic request from a client of a virtualized computing service which supports VNIs, a new interface identifier 401 may be generated for it in the depicted embodiment. In some implementations, a description field 402 may be filled in by the client that requested the creation of the VNI, e.g., "Interface 554 for client group CG-X of container service". As discussed earlier, a VCS within which the VNI is to be used may comprise a plurality of isolated virtual networks (IVNs) in some embodiments. The attributes 495 may contain an IVN identifier 403 (indicating an IVN within which the VNI is configured) in such embodiments.

Any of several types of network addressing-related fields may be included within the set of attributes of a VNI in different embodiments. One or more private IP addresses 405 may be specified in some embodiments, for example. Such private IP addresses, also referred to herein as non-public addresses, may be used internally for routing within a provider network, and may not be directly accessible from outside the provider network (or from within other IVNs) in various embodiments. In some embodiments, at least some non-public IP addresses associated with a VNI may not be IP addresses; that is, addressed formatted according to a proprietary protocol of the provider network may be used, or addresses formatted according to a different public-domain protocol may be used. In general, zero or more public IP addresses 415 may also be associated with VNIs in some embodiments; these IP addresses may be visible outside the provider network, e.g., to various routers of the public Internet or peer networks of the provider network. One or more subnet identifiers 425 (e.g., expressed in Classless Inter-Domain Routing or CIDR format) may be included within attributes 495 in some embodiments, such as identifiers of subnets set up by a client within an IVN in which the VNI is to be used. In one embodiment an identification of a Domain Name Server (DNS) responsible for propagating address(es) associated with the VNI, or other DNS-related information 427, may be included in the attributes 495 as well.

In some embodiments the attributes 495 may include security-related properties 435. Some provider networks may allow users to specify rules, including for example firewall-related rules, for the types of incoming and/or outgoing traffic allowed at compute instances to which a VNI may be attached. Such rules may be termed "security groups" and identified via security group(s) fields 445. Various port and protocol restrictions may be enforced using such rules in some embodiments, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on. In some implementations an attacher list 447 may be specified, indicating which users or entities are allowed to request attachments of the VNI to computing platforms such as virtual machines of the VCS. In some cases a separate detacher list may be used to specify which entities can detach the VNI, while in other cases a single list such as attacher list 447 may be used to identify authorized attachers and detachers. The collection of users or entities that are allowed to set or modify IP addresses (e.g., public IP addresses 415 and/or private IP addresses 405) of the VNI may be provided in IP address setter list 449, and the set of users or entities that own (or can modify various other fields of) the VNI may be specified in owner/modifier field 453 in some embodiments. For example, an owner/modifier identified in field 453 may be permitted to change the attacher list 447 or the IP address setter list in some implementations, thus changing the set of entities permitted to attach or detach the VNI or modify its IP address(es). While the term "list" has been used for fields 447, 449, and 453, logical data structures other than lists (such as arrays, hash tables, sets and the like) may be used to represent the groups of entities given various security privileges, roles and/or capabilities in various embodiments.

In some embodiments, users of the virtualized computing service of a provider network may be allowed to terminate virtual machines (VMs) programmatically. For example, a client may set up VMs, attach VNIs to the VMs, run a desired set of computations on the VMs, and then issue a request to terminate the instances when the desired computations are complete. In such embodiments, a "DeleteOnTerminate" setting 451 may be used to specify what happens to attached VNIs when a VM is terminated. If DeleteOnTerminate is set to "true" for a VNI attached to the VM being terminated, the VNI may be deleted (e.g., a persistent record comprising attributes 495 for the VNI may be removed from the repository in which it was being stored). If DeleteOnTerminate is set to "false", the VNI may be retained, so that for example it may be attached again to some other VM or other computing platforms. In one embodiment, when a VNI is attached to a VM, an attachment record separate from the VNI attributes 495 may be created to represent that relationship, and the DeleteOnTerminate property may be associated with the attachment record instead of or in addition to being associated with the VNI itself. In such an embodiment, the VNI's attributes 495 may include a reference or pointer to the attachment record or records for each of the attachments in which the VNI is currently involved, and different values of "DeleteOnTerminate" may be set for each attachment record.

In one embodiment, the attributes 495 may contain routing-related information such as an indication 465 of whether a source and/or destination check is to be performed for network packets transmitted to a computing platform to which the VNI is attached. If the source/destination check setting is set to "false" or "off", routing decisions may be made based on a packet's source and destination IP addresses, e.g., the packet may be forwarded from one subnet to another; and if the setting is "true" or "on", the computing platform may not perform routing in some embodiments. Thus the source/destination field 465 may be used in some embodiments to control whether a computing platform to which the VNI is attached performs routing or gateway functions on packets for which it is not the final destination, or whether it ignores such packets. Other types of routing-related information, such as route table entries, may also or instead be included in attributes 495 in other embodiments. Billing-related information may be included in attributes 495 in some implementations, identifying for example the entity or user to be billed for network traffic associated with the VNI.

The interface status field 468 may be used to indicate a current state of the VNI—e.g., whether the VNI is "available", "disabled", or "in-repair". Similarly, the attachment status field 469 may be used to indicate whether the VNI is currently attached, detached or in the process of being attached or detached in some embodiments. In one implementation, as described above, a record of an attachment may be created at the time the corresponding attachment operation is performed, and an identifier or identifiers of the current attachments of the VNI may be stored in attachment id field 471. Identifiers of the computing platforms to which the VNI is currently attached may be stored in attached-to instance field 473, and the user or entity that requested the attachment may be identified via attachment owner field 475 in some embodiments. In one embodiment, a list of identifiers of the physical network interface card (NIC) or NICs currently usable for traffic directed to/from the IP addresses of the VNI may be maintained, e.g., in the form of a MAC address(es) field 477. In some implementations, monitoring information 479, such as statistics about the amount of traffic flowing to or from the IP addresses of the VNI, may also be retained among attributes 495. In at least one embodiment in which VNI multiplexing or parent-child hierarchies are supported, pointers 481 to child or branch VNIs of the VNI may be included. Other fields not shown in FIG. 4 may be included in various embodiments.

In one embodiment, some of the fields shown in FIG. 4 may be replaced by references or pointers to other objects. For example, security information for a VNI may be stored in a separate security object, and the attributes 495 may include a reference to the security object. Similarly, each attachment of a computing platform to a VNI may be represented by an attachment object, and the attributes 495 may include pointers to the appropriate attachment objects in some implementations.

Figure 5:
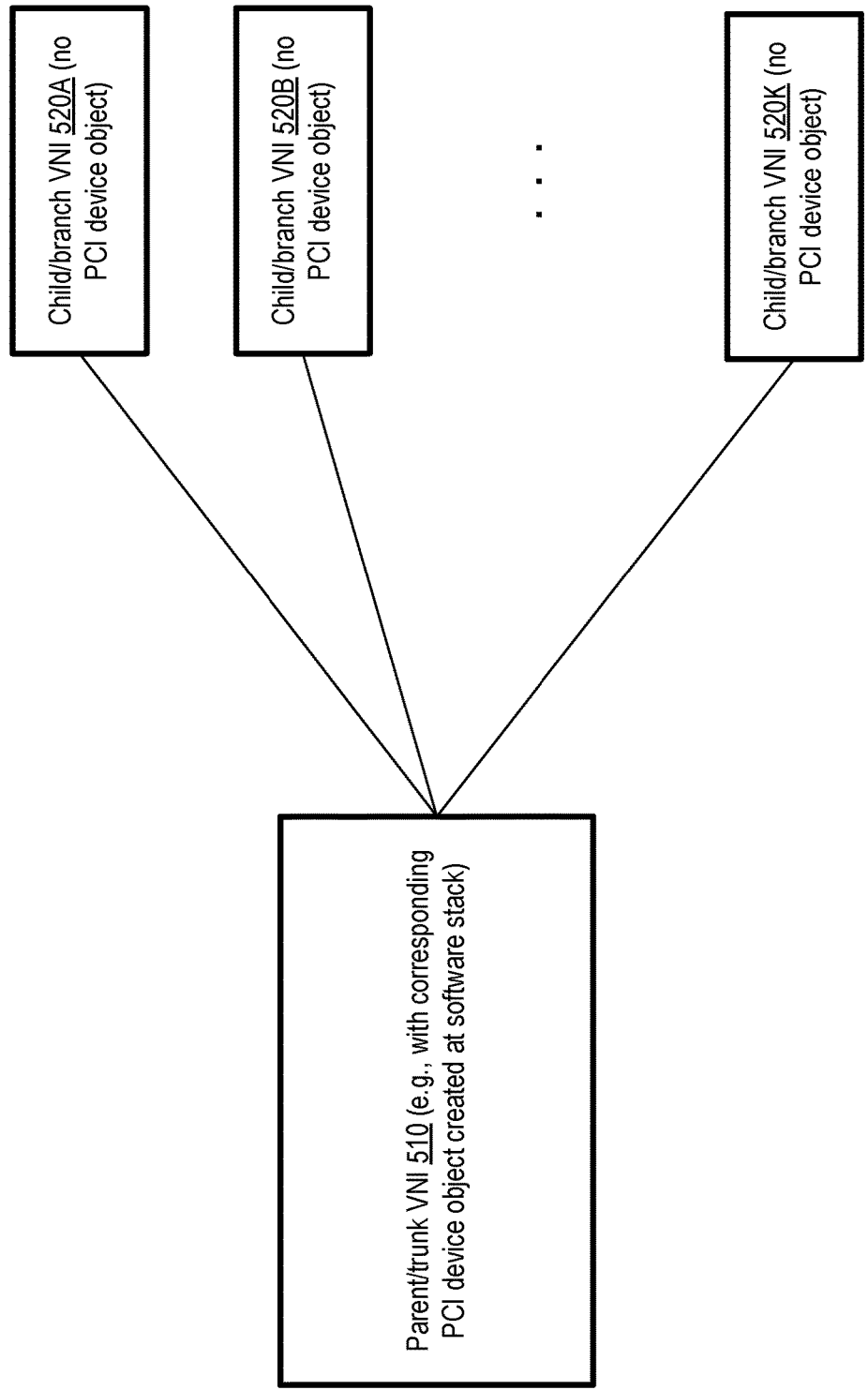
FIG. 5 illustrates an example of a multiplexed virtual network interface, which may be employed for efficiency at a virtualization host used for micro virtual machines, according to at least some embodiments.

In some embodiments, virtual network interfaces may be configured in a trunk-branch or parent-child relationship, such that at least some resources associated with the trunk or parent VNI can be shared among the branches or children while still providing the benefits of virtualized network configuration to the virtual machines to which the branch/child VNIs are attached. These types of VNI relationships may be referred to as multiplexed VNIs in some embodiments. Because of the sharing of resources, such configurations may facilitate greater scalability with respect to the number of network connections that can be sustained at a given virtualization host or a group of virtualized hosts. FIG. 5 illustrates an example of a multiplexed virtual network interface, which may be employed for efficiency at a virtualization host used for micro virtual machines, according to at least some embodiments. A parent or trunk VNI 510 may be configured at a virtualization host first, and then some number of child or branch VNIs 520 (e.g., 520A-520K) may be programmatically associated or attached to the parent VNI 510 as needed. For example, as discussed in further detail below, in some embodiments, if there are K micro VMs running concurrently at a virtualization host, at least K+1 child/branch VNIs may be associated with a single parent/trunk VNI, with one child VNI being used for the data-plane traffic of each micro VM, and one child VNI being shared for control-plane traffic. In at least some embodiments in which PCI is being used for the virtualization offloading cards, only the parent/trunk VNI may require a software PCI device object to be created at the virtualization host, while the child/branch VNIs may not require such objects of their own. As such, in embodiments in which the total number of PCI devices permitted by the operating system (within which the CPA and the VIP processes are launched) is limited, the use of the multiplexed VNIs may help avoid operating system-imposed networking bottlenecks.

Example Virtualization Offloading Card

Figure 6:
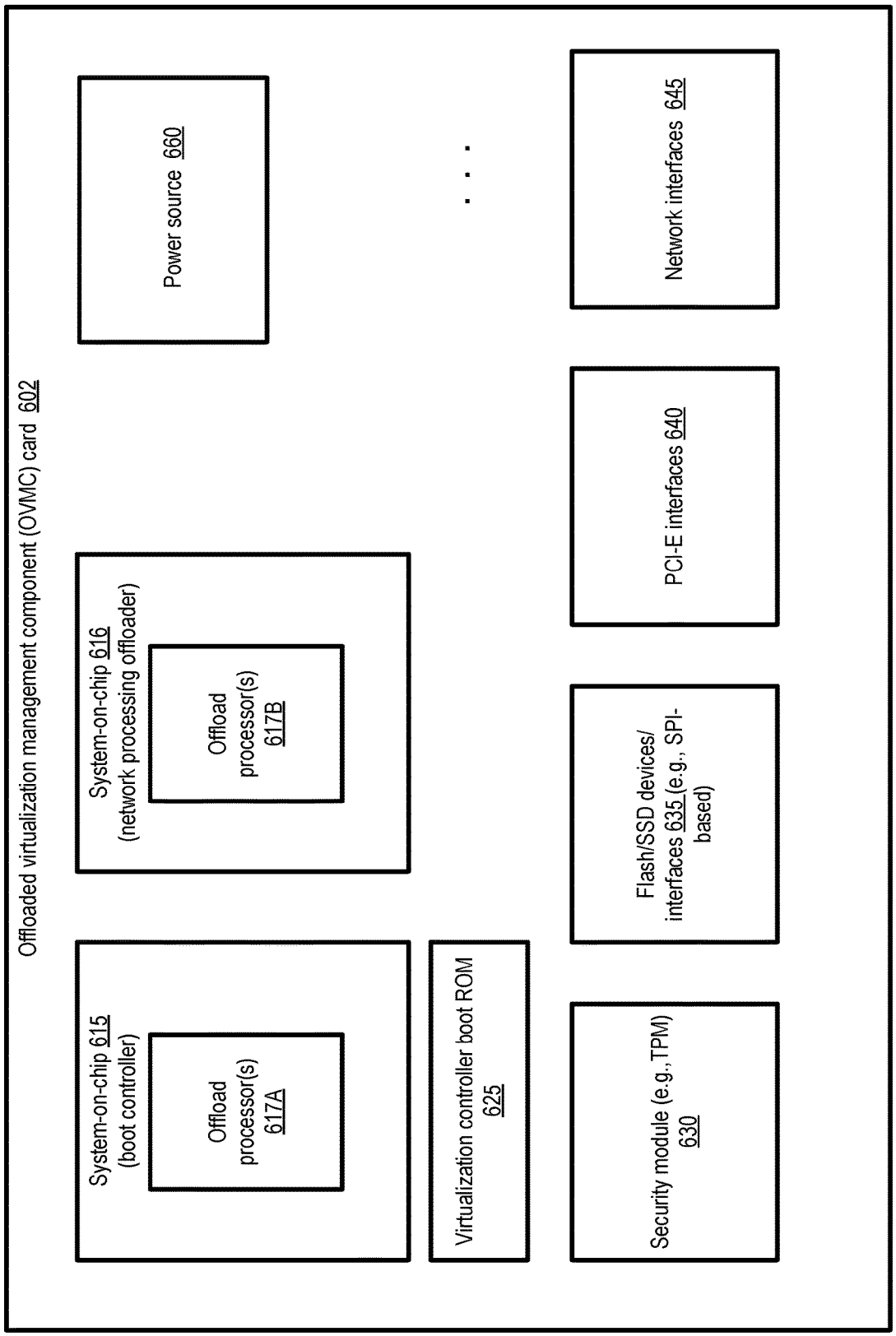
FIG. 6 illustrates example subcomponents of an offloaded virtualization management component card which may be employed at virtualization hosts used for micro virtual machines, according to at least some embodiments.

FIG. 6 illustrates example subcomponents of an offloaded virtualization management component card which may be employed at virtualization hosts used for micro virtual machines, according to at least some embodiments. As mentioned earlier, such a card may also be referred to as a virtualization offloading card in various embodiments. As shown, offloaded virtualization management component (OVMC) card 602 (similar in features and capabilities to OVMC 169 of FIG. 1) may comprise a pair of systems-on-chip (SOCs) 615 and 616 with respective sets of offloading processors 617A and 617B (as distinguished from the primary CPUs of the virtualization host at which the OVMC card is attached and used). One of the SOCs (e.g., 615) may be used for a boot controller, while the other may be used primarily or specifically for network processing offloading in the depicted embodiment. Other distributions of virtualization-related responsibilities may be implemented in different embodiments. A secure boot ROM 625 may be used for an initial phase of a multi-phase boot operation of the virtualization host itself by the boot controller in some embodiments. The OVMC card 602 may also include a security module (such as a trusted platform module (TPM)) 630, which may also be used extensively during the boot procedure and/or for post-boot state verification in some embodiments.

In addition, the OVMC card 602 may comprise a number of storage, power and connectivity-related components in various embodiments. For example, one or more flash devices/interfaces (or SSDs) 635 may be incorporated within the offload card. These devices may be used, for example, to store firmware and/or software corresponding to various virtualization management components, guest virtual machine components, and the like. PCI-E interfaces 6340 may be used for communicating with processes such as the CPA and the VIPs and/or for communication among the SOCs in various embodiments. In other embodiments, other types of interconnects and corresponding interfaces may be used, such as variants of the QuickPath interconnect (QPI) or the UltraPath interconnect (UPI). Network interfaces 645 may be used for communications between the virtualization manager and the control plane of the virtualized computing service in some embodiments, as well as for data-plane communications between the guest virtual machines launched on the host and various network endpoints in at least one embodiment. The OVMC card 602 may also comprise a power source 660 in some embodiments, e.g., sufficient to keep the OVMCs working for at least some targeted number of hours or days in the event of extended power failures. In some implementations, a supercapacitor-based power source may be used.

Separate SOCs on the same card may not be required for the offloaded virtualization manager components in some embodiments. For example, a single SOC capable of performing the boot controller functions as well as network offloading tasks may be utilized in one embodiment. In other embodiments, a separate card may be used for performing network processing tasks than is used for the boot controller. The set of offload card components shown in FIG. 6 is not intended to be comprehensive; several other components, such as timers and the like, may be incorporated at the card in some embodiments. In various implementations, at least some of the components shown in FIG. 6 may not be required.

Example Networking Configuration of Virtualization Host

Figure 7:
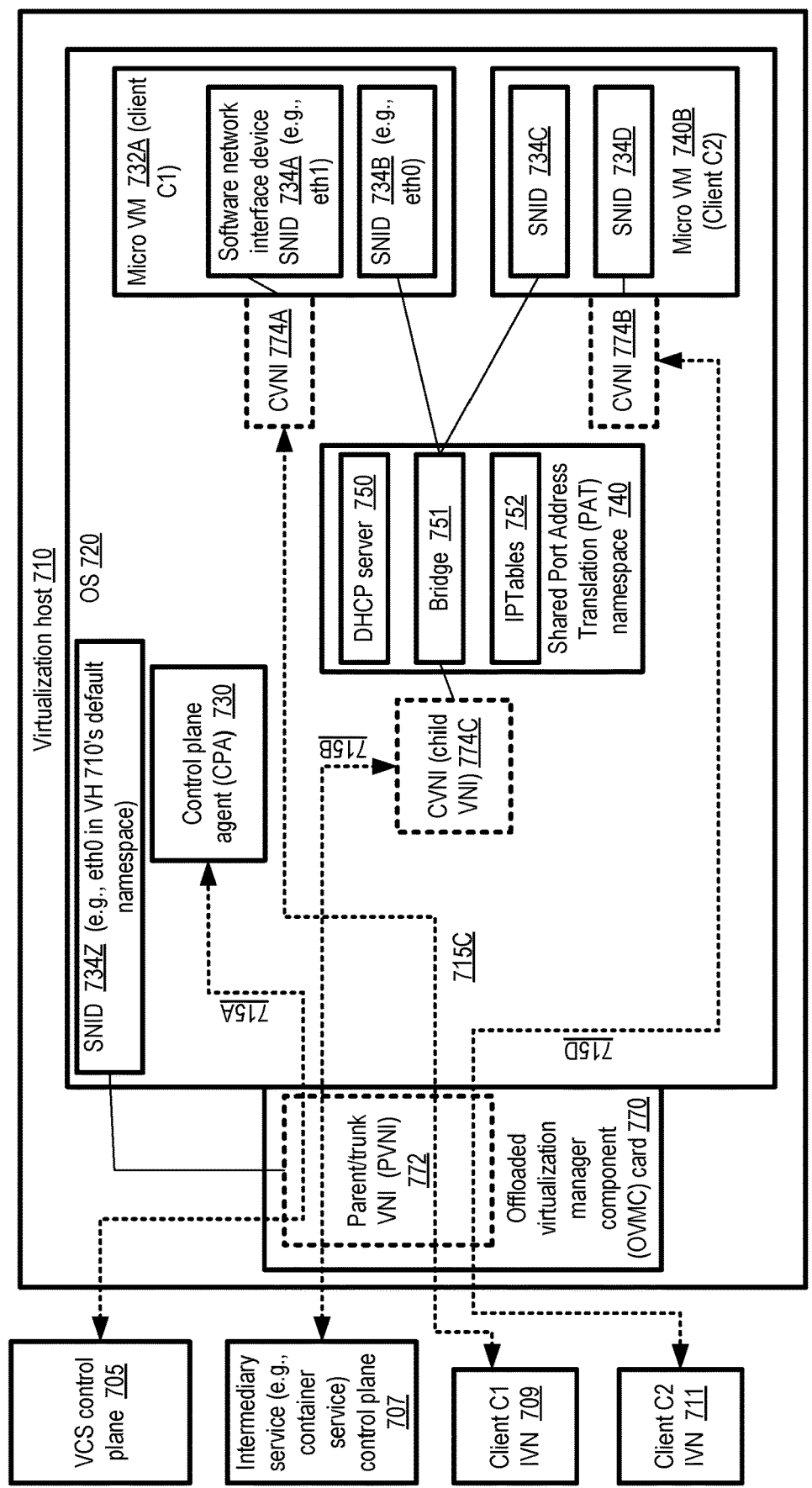
FIG. 7 illustrates example aspects of networking configuration at a virtualization host at which multiple micro virtual machines may be instantiated, according to at least some embodiments.

FIG. 7 illustrates example aspects of networking configuration at a virtualization host at which multiple micro virtual machines may be instantiated, according to at least some embodiments. In the depicted embodiment, virtualization host 710 (which may be similar in features and capabilities to the virtualization hosts shown in earlier figures including FIG. 1) comprises a control plane agent (CPA) or administrative agent 730 and two micro VMs 732A and 732B by way of example. The micro VMs may be implemented as threads within respective virtualization intermediary processes launched at a stripped down version of an OS 720 in some embodiments, and the control plane agent 730 may be implemented as another process within OS 720, as discussed earlier in the content of FIG. 1. In other embodiments, the micro VMs and/or the administrative agent may be implemented as processes or threads launched within a bare metal compute instance.

In the depicted embodiment, networking configuration operations may potentially have to be performed for network messages of at least three types: (a) messages between the CPA 730 and the VCS control plane 705 (b) data-plane messages between the micro VMs 732 and other entities in the IVNs of customers on whose behalf the micro VMs have been set up and (c) control plane messages between an intermediary service, such as a container service, and the micro VMs, which may be used to implement features of the intermediary service (e.g., software containers may be set up at the micro VMs, which may have to interact with an intermediary container service). The volume of traffic expected for the three types of messages may differ (e.g., fewer control plane messages may be expected to flow than data plane messages) in at least some embodiments, and isolation may be required between the different types of messages.

In order to efficiently enable at least these three types of message flows, a number of virtual network interfaces (VNIs) configured in a parent-child tree (or trunk/branch) arrangement may be established in the depicted embodiment using the offloaded virtualization management component (OVMC) card 770. A single parent or trunk VNI (PVNI) 772, may be created for the virtualization host, and child or branch VNIs (CVNIs) 774 may be dynamically attached to or detached from the parent VNI as needed to accommodate varying numbers of micro VMs and different types of traffic.

For VCS control plane traffic 715A, the PVNI 772, which may be attached programmatically to OS 720 (or to a bare-metal instance of which OS 720 is a component) may itself be used in the depicted embodiment. The PVNI 772 may be created during initialization of the virtualization host 710 in at least some embodiments, e.g., when the virtualization host 710 is first set up as one of the hosts to be managed by a VCS control plane cell. In some embodiments in which a variant of Linux or a similar operating system is used for OS 720, the PVNI 772 may appear as the "eth0" software networking interface device (SNID) 734Z in the default namespace of the virtualization host 770. In one implementation, the default namespace of host 770 may comprise the eth0 interface linked to the PVNI, a loopback interface and a default route pointing to the PVNI 772. In at least one embodiment, security settings on the PVNI may restrict access to only allow VCS control plane traffic, thereby isolating this type of traffic from data-plane traffic or control-plane traffic associated with services other than the VCS itself. The PVNI's source/destination check flag (e.g., similar to flag 465 of FIG. 4) may be turned off to allow the PVNI to accept traffic destined for all attached CVNIs. The PVNI's lifetime may be coupled closely with that of the OS 720 (or a bare metal instance to which the PVNI is attached) in some embodiments—e.g., the PVNI may remain configured as long as the OS 720 is configured for use to instantiate VMs.

With respect to data plane traffic between the micro VMs and client IVNs, one CVNI per micro VM may be programmatically associated with the PVNI 772 in the depicted embodiment. For example, for traffic 715C between a client C1's IVN 709 and micro VM 732A established on behalf of client C1, CVNI 774A may be configured. Similarly, for traffic 715D between micro VM 740B, established on behalf of client C2, and client C2's IVN 711, CVNI 774B may be attached to PVNI 772. Each CVNI used for data-plane traffic to client IVNs (such as CVNI 774A or 774B) may be connected to a respective "macvtap" interface in a per micro VM namespace in some implementations. One or more network addresses (e.g., private and/or public IP addresses) address from within the client IVN's range of network addresses may be assigned to each IVN-associated CVNI in at least some embodiments, e.g., from the associated client IVN using DHCP.

For control plane traffic 715B between an intermediary service 707 and a plurality of the micro VMs, Port Address Translation (PAT) may be used in conjunction with a single shared CVNI 774C in the depicted embodiment. A shared PAT namespace 740 may be established, with an associated DHCP server 750, a bridge 751 (e.g., a virtual networking device to which other software network devices can be linked, which may be referred to as a "Linux bridge" in some embodiments) and IPTables 752 or a similar mechanism for implementing port translation. In at least some embodiments, at least a pair of software network interface devices 734 may be configured at each micro VM, one for the data plane traffic to the client IVN, and another for the control plane traffic to the intermediary service. For example, in an embodiment in which a variant of Linux or a similar operating system is used for OS 720, an SNID 734B appearing as eth0 at the micro VM 732A may be linked to bridge 751, while SNID 734A appearing as eth1 may be linked to CVNI 774A. Similarly, with respect to micro VM 740B, CVNI 774C may be associated with one SNID 734D, while another SNID 734C linked to bridge 751 may be used for traffic with the intermediary service control plane 707. A respective "tap" interface (a link layer simulation device), slaved to the bridge 751, may be configured within the PAT namespace for individual ones of the micro VMs 740 in some embodiments. Netfilter IPTables rules may be used to implement PAT, so that the traffic is sent to the correct micro VM in at least one embodiment. The DNCP server 750 may, for example, assign respective private IP addresses to the micro VMs for the control plane traffic. The CVNIs 774 may each be instantiated in some embodiments as VLAN interfaces on the PVNI. The use of Port Address Translation as described above may help reduce the total number of CVNIs that have to be associated with the PVNI 772, and may thus also help support large numbers of micro VMs.

In at least some embodiments, one or more aspects of the networking configuration of a virtualization host may differ from the example networking configuration shown in FIG. 7. For example, in some embodiments, instead of using a trunked or hierarchical set of VNIs, a set of VNIs that are not hierarchically linked (i.e., all PVNIs) may be used. In one embodiment, PAT may not be employed in the manner discussed above. Different networking virtualization protocols may be used in various embodiments—e.g., instead of using VLAN, GRE (Generalized Routing Encapsulation) may be used in one embodiment. In some embodiments, a virtualization host 710 may be provisioned with more than one OVMC card 770—e.g., one OVMC card for control plane or administrative network traffic and another OVMC card for data plane traffic. In one such embodiment, an OVMC card used for control plane traffic may not necessarily utilize a parent/trunk VNI.

In some embodiments, a special "I/O intermediary" micro VM may be established to handle I/O requests on behalf of other micro VMs at the virtualization host—e.g., the other micro VMs may funnel their networking and/or persistent storage read/write requests to the I/O intermediary micro VM, which may perform at least some aspects of I/O virtualization. In contrast to the micro VMs established on behalf of specific customers, such an I/O intermediary micro VM may be persistent in at least some embodiments—e.g., it may remain in existence as long as the virtualization host is being used to respond to micro VM launch and terminate requests. In some embodiments, multiple I/O intermediary micro VMs may be instantiated if needed, e.g., if the total networking and storage request rates of the set of client-requested micro VMs exceeds a threshold.

Networking Configuration Workflow Example

Figure 8:
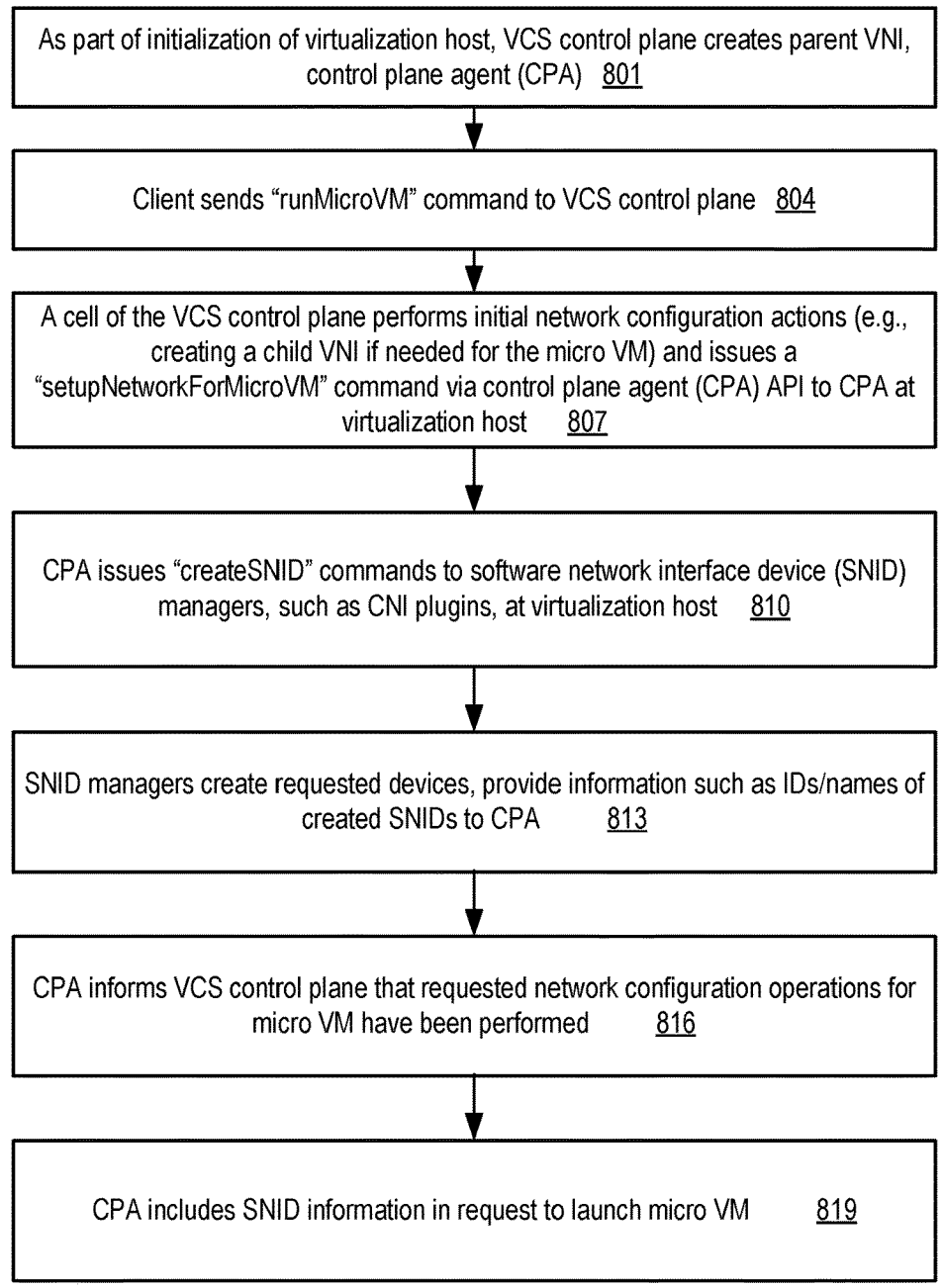
FIG. 8 is a flow diagram illustrating aspects of operations that may be performed to prepare networking configuration for a micro virtual machine before the micro virtual machine is launched, according to at least some embodiments.

FIG. 8 is a flow diagram illustrating aspects of operations that may be performed to prepare networking configuration for a micro virtual machine before the micro virtual machine is launched, according to at least some embodiments. As shown in element 801, in some embodiments, a parent VNI and a control plane agent (CPA) may be configured at a virtualization host during the initialization of the virtualization host, e.g., when the virtualization host is brought online as part of a set of hosts to be managed by a particular VCS control plane cell.

A client of the VCS may transmit the equivalent of a "runMicroVM" command to the VCS control plane (element 804) in the depicted embodiment. The request may indicate various desired properties of the micro VM, such as one or more network addresses, an indication of the subnet(s) of one or more IVNs within which the micro VM is to be configured, security metadata, a flag indicating whether a public IP address is to be assigned to the micro VM, the expected or maximum permitted inbound and/or outbound message rates, and so on in various embodiments. In some implementations in which a micro VM is being established by an intermediary service such as a container service, the runMicroVM command may indicate respective sets of networking properties for two types of traffic—the data plane traffic of the micro VM, and the control plane traffic with the intermediary service.

The client's request may be routed to a particular cell of the VCS control plane in various embodiments. One or more components of the cell (e.g., a request processing component) may perform a first set of initial network configuration actions (element 807), e.g., prior to transmitting a request to the CPA. For example, a child VNI specific to the micro VM, to be used for data plane traffic of the micro VM, may be established and associated with the parent VNI if needed. At least in some embodiments, prior to creating a new child VNI, the VCS control plane may first ascertain whether any existing child VNIs can be re-used. In one implementation, reference counts may be stored for each child VNI, indicating the number of micro VMs attached to the child VNI, and if the reference count of a child VNI goes down to zero, the child VNI may be re-used. In at least one embodiment, instead of using a separate child VNI for each micro VM's data plane traffic, a given child VNI may be used concurrently for several different micro VMs, in which case the VCS control plane may simply identify an appropriate in-use child VNI for the to-be-launched micro VM instead of creating a new child VNI. The VCS control plane may then transmit the equivalent of a "setupNetworkForMicroVM" request to the CPA at the virtualization host selected for the client's micro VM in some embodiments for further stages of network configuration to be initiated at the host itself. In various embodiments, such a request may be transmitted by invoking a control plane API implemented by the CPA, which may differ from the APIs implemented by the virtualization intermediary process (VIP) used for the micro VMs themselves. The request sent to the CPA may, for example, include VLAN identifiers for the child VNI(s) identified/created for the new micro VM to be launched, the SNID names/IDs for the child VNI(s), and MAC addresses of the parent VNI and the child VNI(s) in some embodiments.

In response to the "setupNetworkForMicroVM" request, the CPA may issue commands to create the necessary software network interface devices (the equivalent of "createSNID" commands) to local interface device managers at the virtualization host (element 810). In some embodiments in which the micro VMs are being used for instantiating software containers, the local software network interface device managers may include plugins implementing the Container Network Interface or CNI. In one embodiment, multiple SNIDs may be set up in parallel. After the requested devices are created, their identifiers/names may be provided to the CPA (element 813). In some embodiments, the CPA may inform the VCS control plane that the requested network configuration operations have been completed for the micro VM (element 816). When the CPA launches a virtualization interface process (VIP) and issues a command via the VIP's API to launch a micro VM, information about the objects created for the micro VM may be passed on to the VIP (element 819), and from the VIP to the thread launched for the micro VM.

Example Storage Configuration Options for Micro VMs

Figure 9:
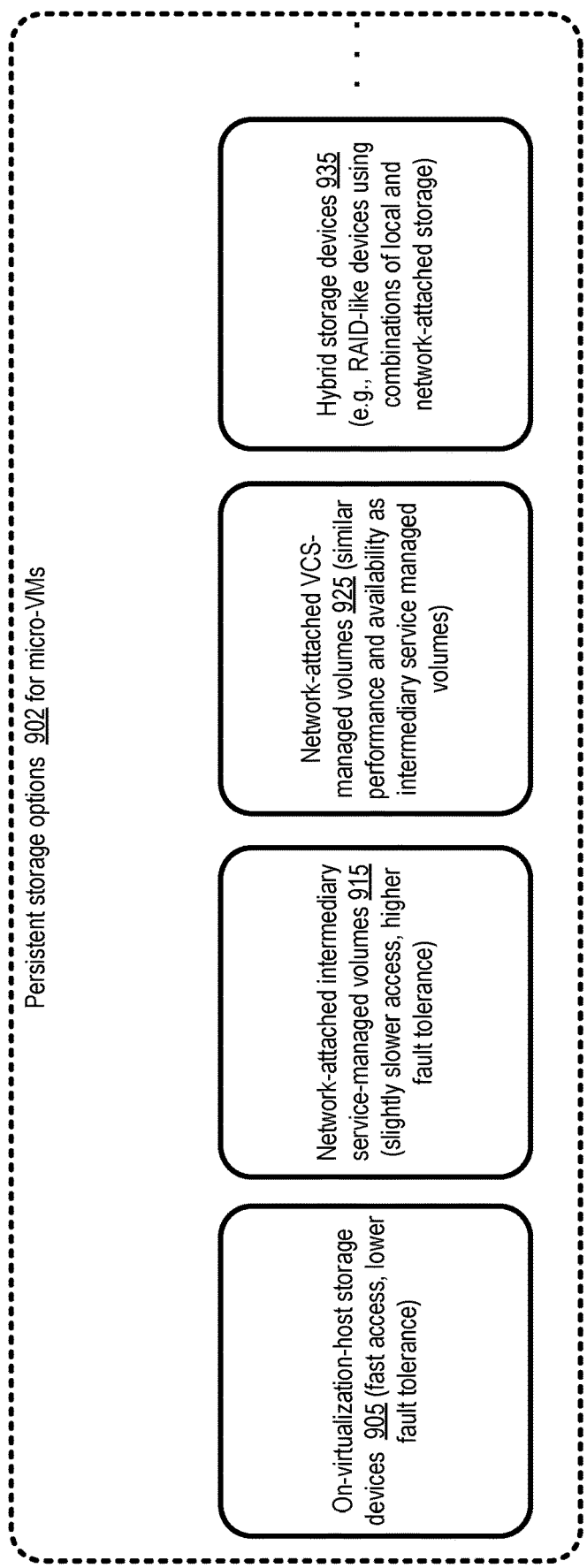
FIG. 9 illustrates example persistent storage options for micro virtual machines, according to at least some embodiments.

Persistent storage from a variety of sources may be used singly or in combination for micro VMs in some embodiments. FIG. 9 illustrates example persistent storage options for micro virtual machines, according to at least some embodiments. As shown, the options 902 may include on-virtualization-host storage devices 905, network-attached volumes 915 managed by an intermediary service such as a software container service, network-attached volumes 925 managed by the VCS, and/or hybrid storage devices 935 which combine local and network-attached storage for the micro VMs.

In some embodiments, the locally attached on-virtualization host storage devices 905 may include rotating disks and/or solid state drives (SSDs); in other embodiments, only rotating disks may be used, or only SSDs may be used. Similarly, the network-attached volumes 915 or 925 may be set up using any desired type of physical storage device in various embodiments, including rotating disks, solid state drives, and the like. The locally attached storage may provide faster access (e.g., read or write I/O latencies) than the network-attached volumes in some embodiments. The network-attached volumes, which may for example present block device interfaces, may provide higher fault tolerance and availability than the local storage in some embodiments. The particular combination of storage devices that are used for a given micro VM may depend on I/O requirements indicated by the client in various embodiments. In some embodiments, the local and network attached storage may be combined to configure the storage accessible from a given micro VM—e.g., an array configuration, similar in concept to some types of RAID (redundant arrays of inexpensive disks) architectures, using both local and network-attached storage devices may be used to form a hybrid storage device 935. In at least some embodiments, a default storage device type (e.g., locally-attached SSDs) may be used if a client does not indicate specific storage requirements for a micro VM. In at least some embodiments, the storage devices for a given micro VM may be initialized/prepared by the control plane agent (CPA) as part of the pre-launch configuration, and passed as parameters to the VIP in the request to launch the micro VM.

Shared Tiered Storage

As mentioned earlier, in some embodiments a given virtualization host may be used for thousands, or tens of thousands, of micro VMs. In many cases, with respect to storage requirements, many of the micro VMs may be similar—e.g., they may be booted from similar machine images, they may access similar operating storage modules in a read-only manner, and so on. To help instantiate very large numbers of micro VMs on a single host, a shared tiered hierarchy of storage may be implemented in some embodiments, with at least some storage objects or devices being shared by multiple micro VMs, thereby reducing the overall storage requirements.

Figure 10:
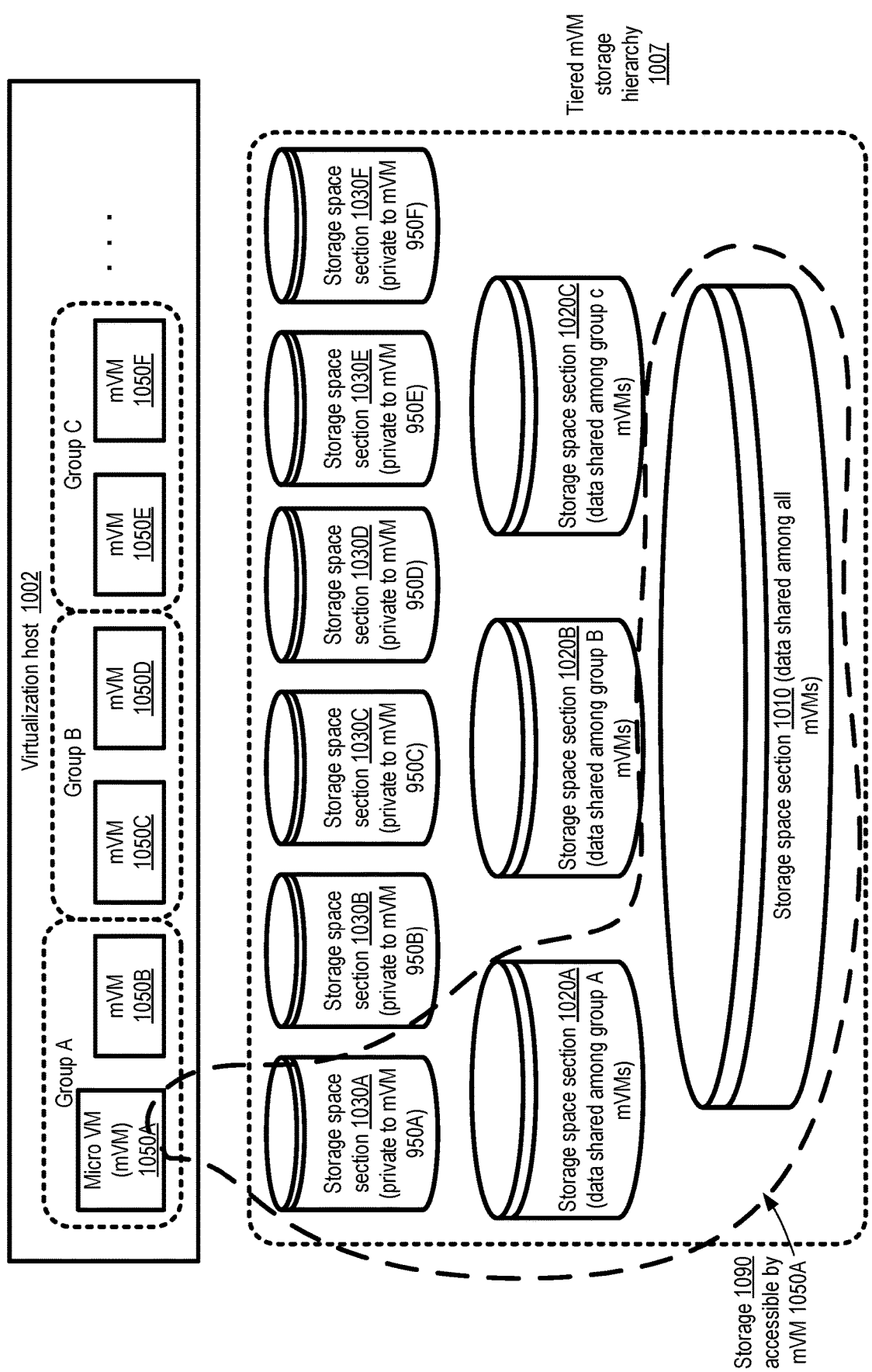
FIG. 10 illustrates an example tiered hierarchy of persistent storage that may be employed for micro virtual machines, according to at least some embodiments.

FIG. 10 illustrates an example tiered hierarchy of persistent storage that may be employed for micro virtual machines, according to at least some embodiments. In the depicted embodiment, a virtualization host 1002 (which may be similar in features and capabilities to virtualization hosts shown in earlier figures including FIG. 1) may be used for a number of micro VMs that can be subdivided into groups with at least some overlap in the set of storage objects accessed. In the simplified example depicted, six micro VMs 105A-105F are shown, divided into three groups based on storage access similarities. Group A comprises micro VMs 1050A and 1050B, Group B comprises micro VMs 1050C and 1050D, while group C comprises micro VMs 1050E and 1050F.

A tiered micro VM storage hierarchy 1007 may comprise a base tier comprising storage space section 1010 for data shared among all micro VMs at the host 1002, per-group storage sections 1020A, 1020B and 1020C, and per-micro VM storage sections 1030A-1030F in the depicted embodiment. A given micro VM 1050 may be granted access to the entire storage section 1010, the particular shared storage space section 1020 for the group to which the micro VM belongs, and a private section 1030 to which no other micro VM is granted access. For example, the storage accessible by micro VM 1050A may comprise private section 1030A, group A shared section 1020A, and the globally shared section 1010. Similar combinations of storage sections from all three layers may be configured for access by other micro VMs. The tiered hierarchy may be defined at various levels of abstraction in different embodiments—e.g., in some embodiments, the sections 1010, 1020 and 1030 may comprise respective portions of file systems, while in other embodiments, at least some of the sections may comprise portions of volumes, or whole volumes. Any desired types of storage devices may be used for the sections in various embodiments—e.g., local storage, network-attached storage, or hybrid storage of the kind discussed in the context of FIG. 9 may be employed.

Machine Image Caching

In at least some embodiments, a number of different machine images (also referred to as boot images) may be usable for micro VMs at VCS virtualization hosts. By default, such images may be stored at a VCS control plane repository in one embodiment. Several (or all) of the images may share common files and/or other storage objects in some embodiments—that is, an overlap may exist between the set of storage objects included in different images. To help speed up the process of launching a micro VM, while still keeping the total amount of storage being used for the images within reasonable limits, in some embodiments common portions of one or more boot images may be cached ahead of time at a virtualization host, with the final image being constructed by combining cached portions with portions retrieved from a VCS repository.

Figure 11:
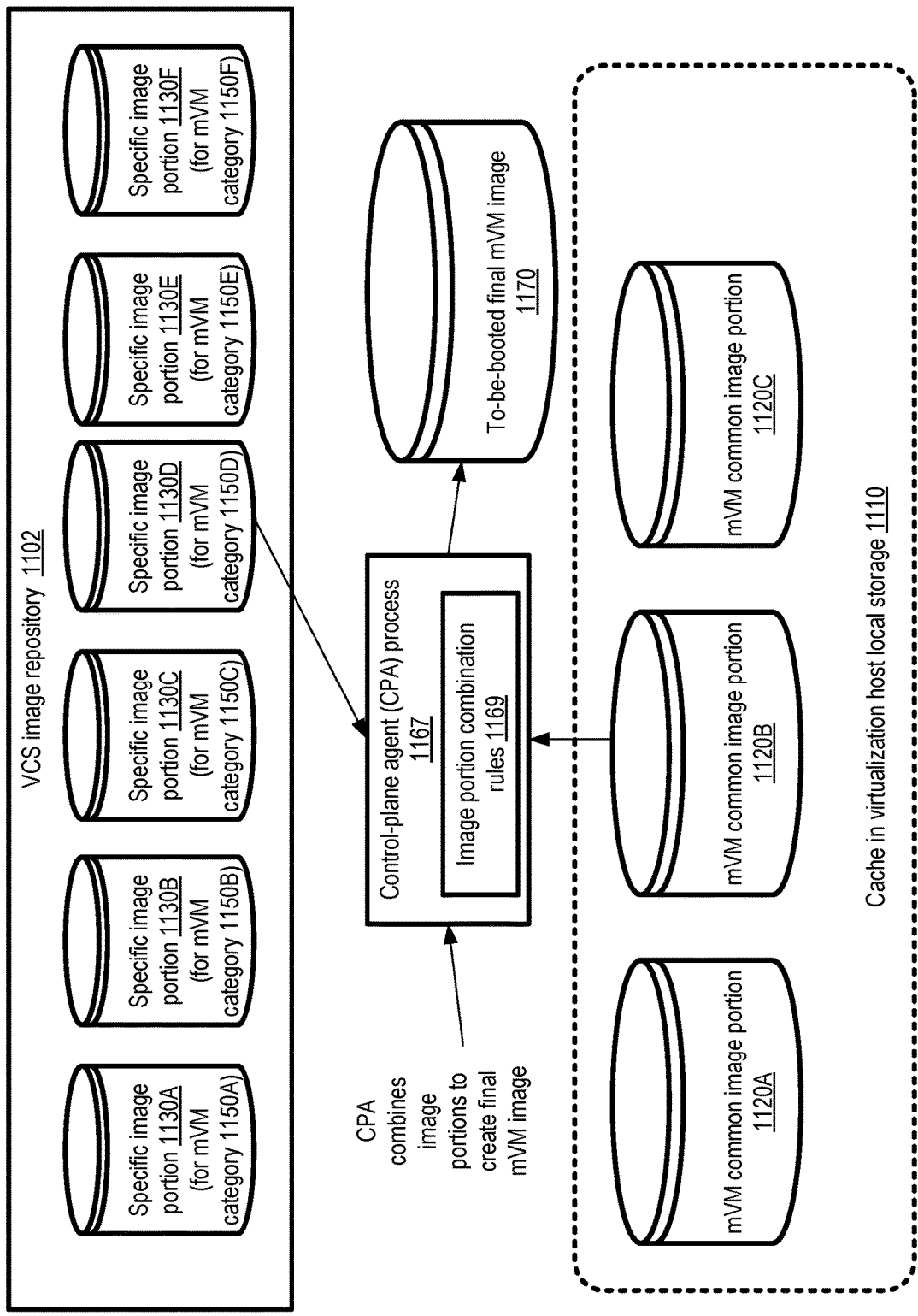
FIG. 11 illustrates an example caching technique for portions of boot images used for micro virtual machines, according to at least some embodiments.

FIG. 11 illustrates an example caching technique for portions of boot images used for micro virtual machines, according to at least some embodiments. In the depicted embodiment, a number of different boot images may be used for respective categories of micro VMs (e.g., categories which differ from one another in resource usage, one or more layers of a software stack, etc.), such as categories 1150A-1150F. A cache 1110 in local storage of a virtualization host may be used for common image portions 1120A, 1120B and 1120C as shown. Individual ones of the common image portions 1120 may be combinable with category-specific portions 1130 (e.g., one of 1130A-1130F) that are stored at a VCS repository to obtain the to-be-booted final image. In some embodiments, the control-plane agent process 1167 at the virtualization host may store a set of image combination rules 1169, which indicate the specific repository-based portions 1130 that are to be combined with a particular cached portion 1120 to assemble the final micro VM image 1170 for a particular request. For example, as shown, the specific image portion 1130D may be combined by the CPA 1167 with cached common image portion 1120B to generate the final image 1170 for a particular request from a client.

Example Virtualization Intermediary Process Threads

Figure 12:
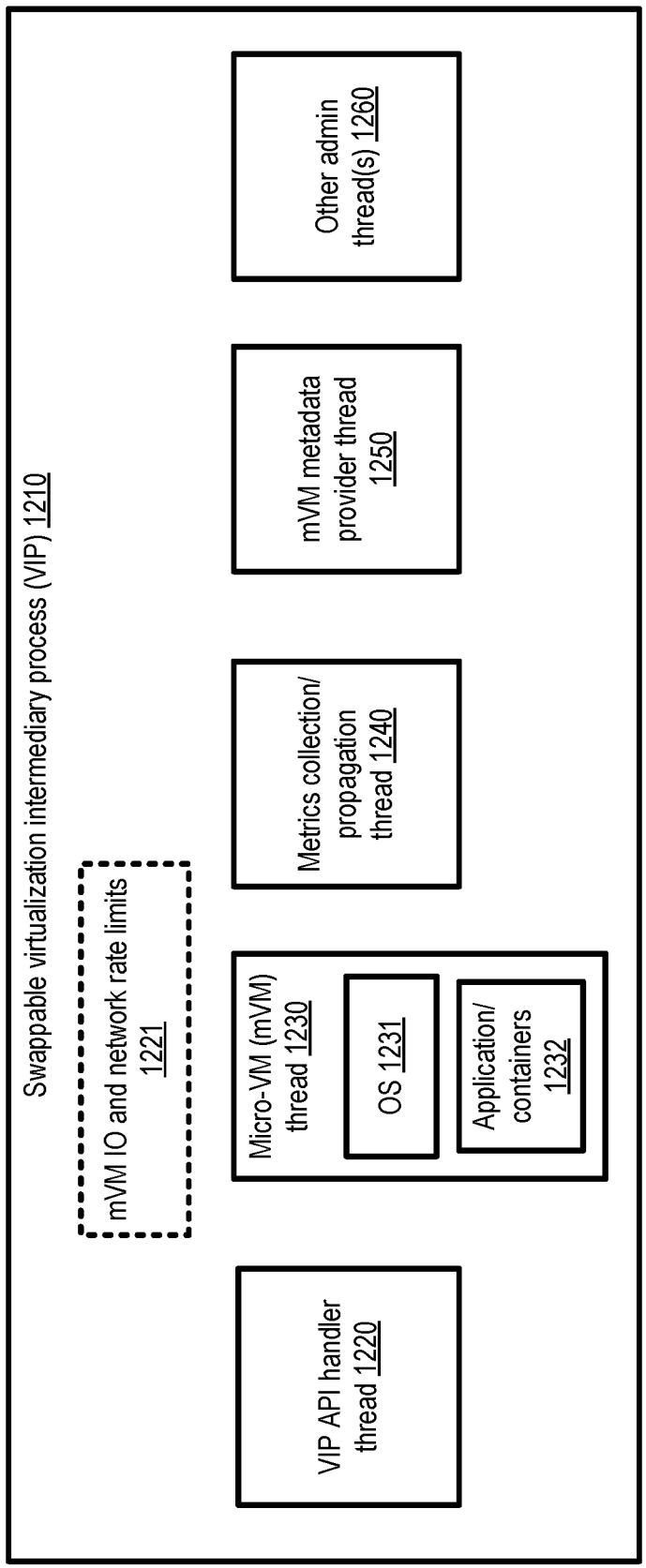
FIG. 12 illustrates an example collection of threads which may be configured at a swappable virtualization intermediary process at a virtualization host, according to at least some embodiments.

As mentioned earlier, in some embodiments individual micro VMs may be implemented using a single child thread of a virtualization intermediary process (VIP) launched by a control plane agent (CPA) at a virtualization host. FIG. 12 illustrates an example collection of threads which may be configured at a swappable virtualization intermediary process at a virtualization host, according to at least some embodiments. As shown, a swappable VIP 1210 may comprise (among others), an API handler thread 1220, a micro VM thread 1230, a metrics collection and propagation thread 1240, a metadata provider thread 1250 and/or other administrative threads 1260 in the depicted embodiment.

When the VIP is launched, e.g., in response to a command issued by a CPA, at least the API handler thread 1220 may be instantiated in the depicted embodiment, enabling the VIP to receive commands/requests for various operations including launching/terminating a micro VM. In at least some embodiments, a 1:1 relationship may exist between micro VMs and VIPs, and the VIP may be terminated when a request to terminate the micro VM is received (e.g., via the API handler thread). The micro VM thread 1230 may comprise its own operating system 1231 and a software stack comprising one or more applications, software containers and the like as indicated in element 1232. The metrics collection and propagation thread 1240 may gather various kinds of measurements pertaining to the micro VM and provide them to the VCS control plane, e.g. in response to command issued from the CPA via the API handler thread in some embodiments.

The metadata provider thread 1250 may be sent various elements of metadata pertaining to the micro VM by the CPA in the depicted embodiment, such as an identifier of the machine image used for the micro VM, block device mappings of the micro VM, an IP hostname of the micro VM, information about the authorization roles (if any) associated with the micro VM, scripts that may have been used when launching the micro VM, networking configuration, monitoring information (which may have been collected initially by the metrics thread 1240) and so on. Such metadata may be accessed from the micro VM itself, e.g., even in the absence of connectivity to entities outside the VIP, and may be used for example to troubleshoot problem states, make configuration changes and the like. The VIP may also comprise one or more additional components which enforce a set of I/O and networking rate limits 1221 in some embodiments, throttling the I/O or network requests issued from the micro VM thread 1230 to ensure that the micro VM does not exceed its expected quotas of resources. In at least some embodiments, as discussed below, different rate limits may be enforced during respective phases of operation of a micro VM—that is, rate limits with respect to be or more resources may not necessarily be kept unchanged during the entire lifetime of a given micro VM. Early on in the lifetime of a micro VM, for example, when initialization-related operations that may involve extensive communication with external entities (such as a container service) are being performed, higher rates of I/O may be permitted than later on in the lifetime of the micro VM.

In some embodiments, VIPs with the kind of thread collection shown in FIG. 12 may not be employed to instantiate micro VMs. Instead, a different process/thread collection which also responds to a similar set of APIs invoked from a control plane agent, and generates a micro VM thread or process with a similar level of isolation with respect to other micro VMs may be employed in such embodiments.

Scalability Factors

Figure 13:
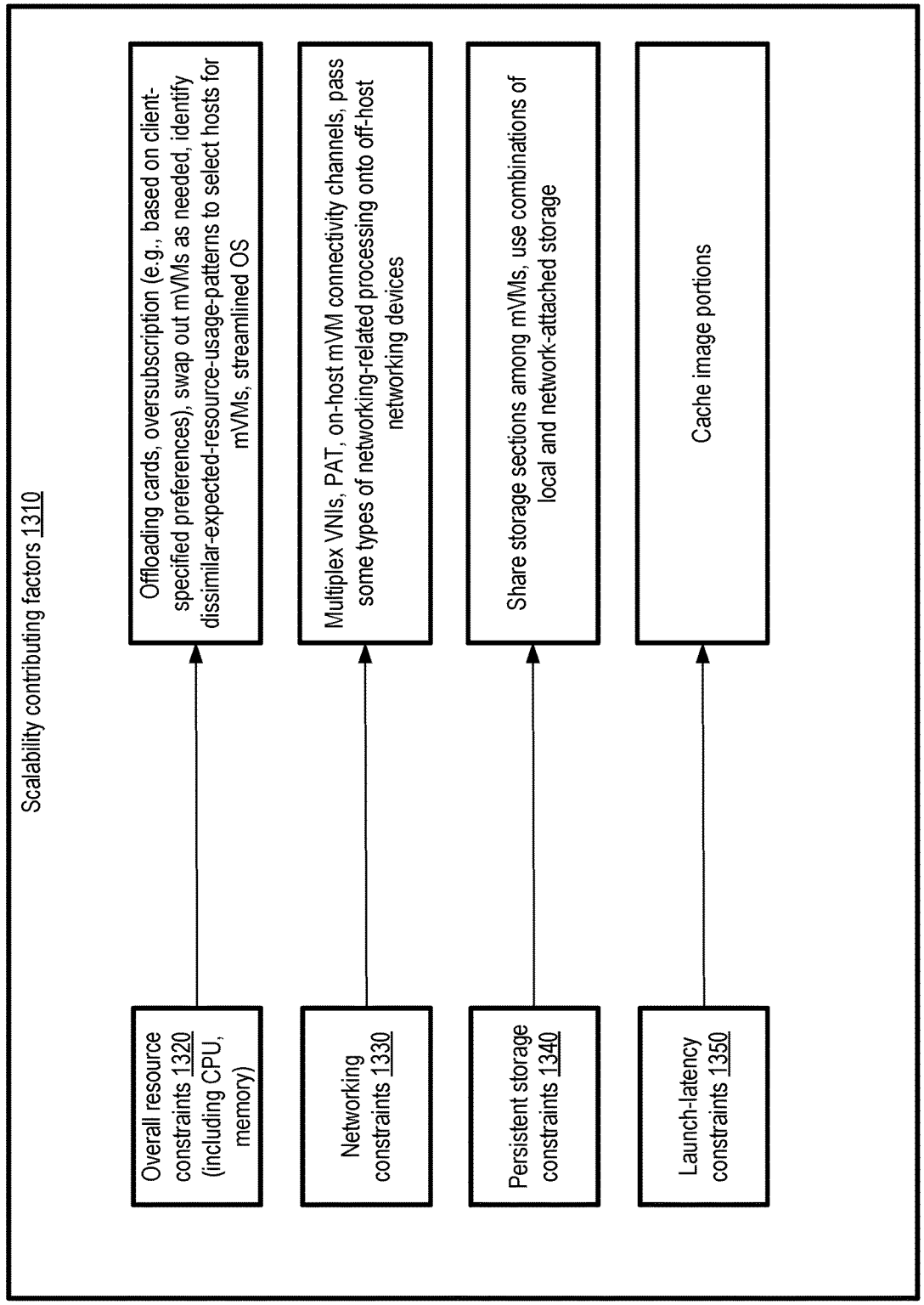
FIG. 13 illustrates a high level overview of factors that may collectively enable very large numbers of micro virtual machines to be launched at a single virtualization host, according to at least some embodiments.

FIG. 13 illustrates a high level overview of factors that may collectively enable very large numbers of micro virtual machines to be launched at a single virtualization host, according to at least some embodiments. Even as more and more performant hardware becomes available for individual virtualization hosts, each host may have various types of resource constraints which tend to limit the number of micro VMs that can be launched on it. In order to alleviate or limit the impact of such constraints, a number of techniques may be employed in various embodiments, so that thousands or tens of thousands of micro VMs may be instantiated without saturating the utilization of various types of resources of the hosts.

A number of the techniques may help to alleviate overall constraints 1320 for several types of resources, including, among others, memory and CPU resources of the virtualization hosts. Such techniques may include, for example, the use of virtualization offloading cards to reduce the virtualization-related overhead on the CPUs and memory of the host, the use of oversubscription in combination with swapping out micro VMs as needed, the use of streamlined versions of operating systems from which support for rarely-used legacy devices has been stripped, and/or intelligent placement algorithms that attempt to place combinations of micro VMs that differ in their individual resource usage mixes. Intelligent placement may, for example, attempt to ensure that no single type of resource becomes the bottleneck at a virtualization host while other types of resources remain under-utilized—for example, the VCS may avoid scenarios in which a thousand micro VMs with disk-intensive workloads are placed on the same host while the host's CPUs remain at a less than 20% overall utilization level.

Any combination of several techniques may be used to alleviate networking-related constraints 1330 of a virtualization host in at least some embodiments. Such techniques may include, for example, the use of multiplexed (parent-child) VNI hierarchies as discussed earlier, Port Address Translation using a single child VNI for some types of traffic from all the micro VMs on the host, special optimized on-host channels for connectivity among micro VMs at a given host, re-using existing VNIs or SNIDs, and/or passing some types of network processing tasks on to off-host networking devices. In the latter technique, when a certain type of packet is received at an OVMC card responsible for networking-related virtualization, the card may generate an encapsulation packet and transfer the received packet in encapsulated form to an off-host network processing device. As a result, portions of the overall workload associated with networking for virtual machines of the host may be farmed out not just to the OVMC cards, but also to external devices in such embodiments.

With respect to alleviation of persistent storage constraints 1340, the techniques employed in some embodiments may include sharing sections of storage among micro VMs using a tiered storage hierarchy and/or using combinations of locally attached storage and network-attached storage as discussed earlier. With respect to constraints on micro VM launch latency 1350, the use of caching of boot/machine image portions as discussed earlier may help shorten launch times. A number of other techniques may be used in some embodiments to support the launching of large numbers of micro VMs on individual hosts, and/or some of the techniques indicated in FIG. 13 may not be used.

Cell-Based VCS Control Plane

Figure 14:
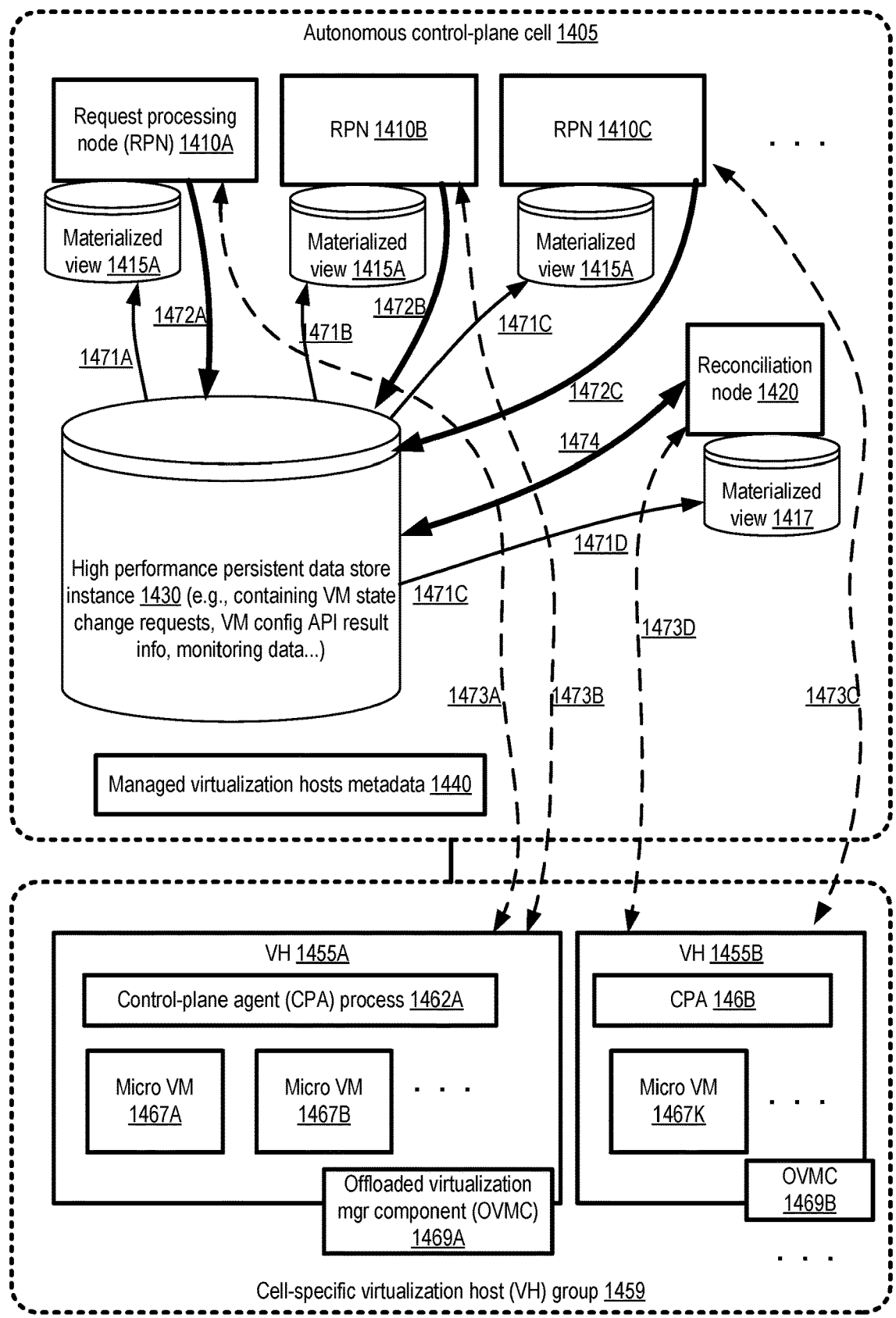
FIG. 14 provides a high-level overview of an example architecture of a control plane cell of a virtualized computing service, according to at least some embodiments.

In various embodiments, the use of a modular cell-based control plane for the VCS may also help to improve the overall performance levels and scalability achievable for various types of VM requests. As needed, new cells may be added to the control plane to handle increasing workloads in various embodiments; as a result, the control plane itself may be eliminated as a potential bottleneck with respect to virtualization operations. FIG. 14 provides a high-level overview of an example architecture of a control plane cell of a virtualized computing service, according to at least some embodiments. As shown, an autonomous control plane cell 1405 may comprise some number of request processing nodes (RPNs) 1410 (e.g., 1410A, 1410B and 1410C), one or more reconciliation nodes 1420, an instance 1430 of a high performance persistent data store, and metadata 1440 indicating a group of one or more virtualization hosts to be managed by the cell in the depicted embodiment. In some embodiments the virtualization hosts may be considered part of the cell.

In various embodiments, a log-based persistent data store 1430 may be used. In at least some embodiments, an optimistic concurrency control algorithm may be employed for write transaction submitted to the data store instance 1430. The instance 1430 may serve as a repository storing a sequence of immutable records related to VM state changes, arranged in the order in which the corresponding state change events were processed in some embodiments. The instance 1430 may, for example, include records indicating requests for VM state changes received at the RPNs (such as requests to launch, terminate or modify VMs), API requests submitted to virtualization hosts (e.g., to control plane agents of the kind described above) to implement requested configuration changes, results of such API requests, monitoring data, and/or records of rectification operations which may be initiated by the reconciliation node 1420 in some embodiments. At least a portion of the contents of the instance 1430 may be materialized in some embodiments at individual ones of the RPNs and/or the reconciliation node. For example, a respective materialized view 1415 (e.g., 1415A, 1415B or 14315C) comprising at least a relevant subset of the contents of the instance 1430 may be generated and updated as needed for each of the RPNs 1410 (as indicated by arrows 1471A, 1471B and 1471C), and a materialized view 1417 may be generated and updated as needed for the reconciliation node 1420 (as indicated by arrow 1474) in the depicted embodiment.

When a client of the VCS submits a VM instantiation or launch request, a request router of the VCS may direct the request (or an internal representation of the request) to a selected RPN 1410 at a selected cell 1405 in various embodiments. Any of various properties of the request (e.g.

the identity of the requester, a networking property such as an IVN subnet, etc.) and/or the individual cells that have been established at the VCS control plane (e.g., resource utilization information pertaining to the cells or the hosts managed by the cells) may be used to decide which cell should be responsible for the requested VM. In some embodiments in which the selected cell contains multiple RPNs, a particular RPN may be selected using a random selection policy. In other embodiments, a mapping function between one or more VM request properties and an RPN ID may be used to select the RPN. In some embodiments, after a particular RPN is selected to respond to the instantiation of a VM, that same RPN may be used for processing any additional state changes requests for that VM. In contrast, in other embodiments, any of the RPNs may be selected to process one or more of the state change requests pertaining to a given VM.

After receiving an indication of a request to instantiate a VM, an RPN 1410 may initiate at least a portion of a workflow to launch a VM with the properties indicated in the request in the depicted embodiment. The workflow may comprise a synchronous set of operations and an asynchronous set of operations in some embodiments, with the synchronous operations being performed by the RPN 1410, and the asynchronous operations being performed by the reconciliation node. In one embodiment, the RPN may store a record of the request at the data store instance 1430 (as indicated by arrows 1472A, 1472B and 1472C), and then submit one or more API requests to a selected virtualization host 1455 (e.g., 1455A or 1455B) of the group 1459 of virtualization hosts being managed by the cell. The virtualization hosts 1455 shown in FIG. 14 may be similar in features and capabilities to the virtualization hosts shown in earlier figures, including FIG. 1. Such APIs calls may be used, for example, to perform some of the preparatory configuration steps (such as the attachment, to a parent VNI at the host, of a child VNI to be used by the requested VM) discussed earlier, and then to submit the request the launch of a VM to the CPA at the virtualization host. The invocation of one or more APIs by an RPN 1410, and the corresponding responses, are indicated by arrows labeled 1473 (1473A, 1473B and 1473C) in FIG. 14. In embodiments in which the virtualization host comprises an offloaded virtualization manager component 1469 (e.g., OVMCs 1469A or 1469B), the portion of the workflow initiated by the RPN may involve the use of the OVMC—e.g., at least a portion of the network and storage I/O configuration of the requested VM may be performed with the help of the OVMC. In some embodiments, a response to the API call may also be recorded in the instance 1430 of the persistent data store by the RPN. For example, in response to the API invocation, a CPA 1465 (e.g., 1465A or 1465B) at a virtualization host 1455 (e.g., 1455A or 1455B) may start up a micro VM 1467 (e.g., 1467A, 1467B or 1467C) and provide a VM identifier or other metadata pertaining to that micro VM to the RPN in some embodiments. A similar approach may be taken by an RPN to other types of VM configuration change requests in various embodiments. For example, when a request to modify or terminate a VM is received, a record of the request may be stored in the instance 1430 and an API may be invoked to perform the modification or termination. In some embodiments, the API may for a VM state change may be invoked before, or in parallel with, the insertion of the record of the request in the data store instance 1430.

In some cases, a request (such as an API call initiated by the RPN) directed to the virtualization host 1455 for a VM state change may not succeed, or may take a longer time than expected. In order to deal with such scenarios, in some embodiments the reconciliation node 1420 may perform one or more anti-entropy iterations, e.g., as part of the asynchronous portion of the workflow associated with VM state change requests. In a given anti-entropy iteration, the actual states of one or more VMs may be compared to their respective expected states, and one or more rectification operations to attempt to change the states of the VMs to their expected state may be initiated. In one embodiment, the reconciliation node 1420 may examine at least a portion of the data store instance 1430 to determine the expected states and/or the actual states, as indicated by arrow 1474. In at least one embodiment, the reconciliation node 1420 may communicate with one or more of the virtualization hosts 1455 (e.g., with the CPA 1462, or with a VM itself) to determine the actual state of a VM, as indicated by arrow 1473D. If a discrepancy between an expected state and an actual state of a VM is identified, the reconciliation node 1420 may take any of several types of rectification actions in the depicted embodiment: e.g., a request may be sent to a virtualization host 1455 via an API invocation, or a request may be sent to an RPN to re-try an operation that has not succeeded. In at least some embodiments, a record of the rectification action may be added to the instance 1430 of the data store by the reconciliation node 1420. A number of different types of triggers may lead to the initiation of an anti-entropy iteration of the reconciliation node in various embodiments—e.g., a new iteration may be initiated when a particular amount of time has elapsed since the previous iteration, when a certain number of state change requests have been processed by the RPNs since the previous iteration, when an apparent failure is detected at some component of the cell 1405, or if a request for an anti-entropy iteration is received (e.g., from another component of the cell 1405, from a virtualization host 1455, or from some other component of the VCS control plane).

Various parameters governing the structure and internal organization of a cell 1405 may be tuned or adjusted over time in some embodiments, e.g., by a cell pool manager, in an effort to ensure that targeted levels of performance, availability and fault tolerance regarding client requests for VM state changes continue to be maintained. Such parameters may, for example, include the number of RPNs 1410 to be set up in a cell, the number of reconciliation nodes 1420 to be set up, the write rate capacity of the persistent data store instance 1430, the number and types of virtualization hosts 1455 managed by the cell, how many distinct hosts are to be used for RPNs and reconciliation nodes at the cell (e.g., whether there is a 1:1 relationship between RPNs and hosts, in which case each RPN would be set up on a respective host, or an N:1 relationship) and so on. In at least some embodiments, the RPNs and/or the reconciliation node may be implemented at respective virtual machines (e.g., as instances of standardized virtual machine types supported at the VCS, or as instances of micro VMs).

Provider Network Environment

Figure 15:
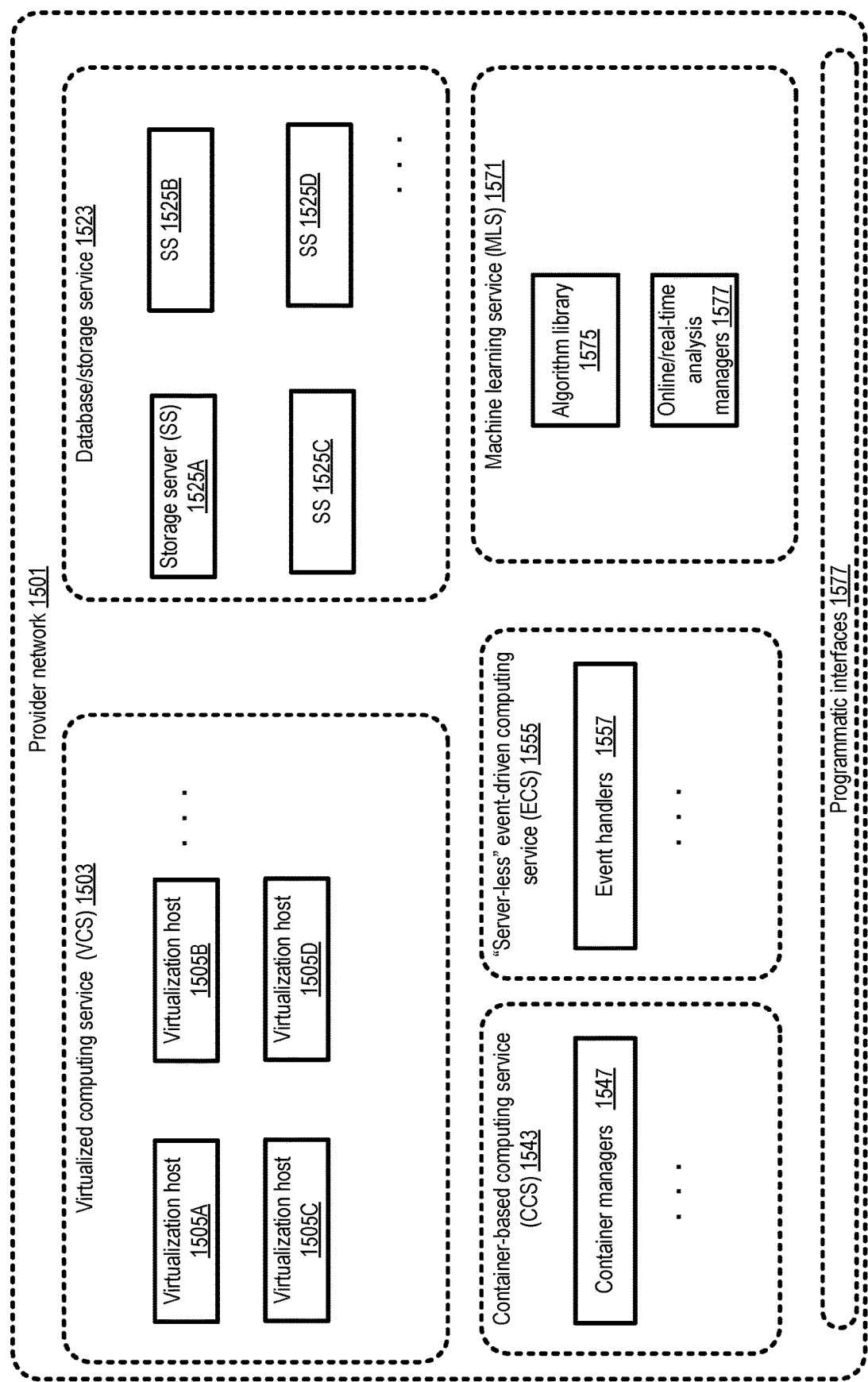
FIG. 15 illustrates a provider network environment at which a virtualized computing service may be implemented, according to at least some embodiments.

FIG. 15 illustrates a provider network environment at which a virtualized computing service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1501 may comprise resources used to implement a plurality of services, including, in addition to a virtualized computing service (VCS) 1503, a container-based computing service 1543, an event-driven computing service 1555, a database or storage service 1523, and a machine learning service (MLS) 1571. Components of a given service may utilize components of other services in the depicted embodiment—e.g., for some machine learning tasks, a component of the machine learning service 1571 may utilize micro virtual machines implemented at virtualization hosts such as 1505A-1505D. The virtualization hosts 1505 may be similar in capabilities and features to the virtualization hosts shown in FIG. 1 and other figures discussed earlier. Input data, intermediate results, final results and/or other artifacts of various machine learning algorithms or models, may be stored at storage servers 1525 (e.g., 1525A-1525D) of the database or storage service 1523 in some embodiments. In some embodiments, a storage service 1523 may be utilized by at least some types of virtual machines instantiated at the VCS 1503, e.g., to configure volumes that present block-device interfaces for use from micro VMs instantiated at the VCS. Individual ones of the services shown in FIG. 15 may implement a respective set of programmatic interfaces 1577 which can be used by external and/or internal clients (where the internal clients may comprise components of other services) in the depicted embodiment.

A container-based computing service (CCS) 1543 may enable its clients to use software containers, without having to provision the underlying hardware, virtual machines or operating systems in the depicted embodiment. Software containers are lightweight mechanisms for packaging and deploying applications, providing a consistent portable software environment for applications to easily run and scale. In at least some embodiments, micro VMs implemented at the VCS 803 may be instantiated for container-based computing service clients. Individual ones of the micro VMs may comprise one or more software containers in such embodiments, established in response to requests submitted by the CCS on behalf of CCS clients. As such, the CCS may represent one example of an intermediary service of the kind discussed earlier with respect to at least some micro VMs. In some embodiments, network channels (e.g., using Port Address Translation as described in the context of FIG. 7) for interactions between the control plane of the CCS and the micro VMs may be established by the VCS. In such embodiments, the requests to the VCS to instantiate micro VMs may be submitted by container managers 1547 of the service 1543.

At event-driven computing service (ECS) 1555, resources for requested operations may be provisioned dynamically using VMs created at the VCS, after a request for the operation triggers the provisioning in the depicted embodiment. Such computing services which support dynamic event-driven provisioning may be referred to as "server-less" computing services in some embodiments, as specific (virtual or physical) servers may not have to be acquired in advance of the processing of various client-requested operations. In effect, in some embodiments, clients of an event-driven computing service 1555 may package up some program code that is to be run and submit it to the service for execution at resources selected by the service; the clients may not necessarily care where their packaged code is run as long as the results are provided within desired time-frames. As such, for some types of requests directed at service 1555, micro VMs instantiated using the VCS may be ideal execution platforms, and the ECS 1555 may represent another example of an intermediary service that utilizes the micro VM capabilities of the VCS. As in the case of the CCS 1543, in some embodiments network channels may be set up at the virtualization hosts 1555 for traffic between the micro VMs and the control plane of the ECS 155. In some embodiments, the event-driven computing service 1555 and/or the container-based computing service 1543 may be implemented as subcomponents of the VCS 1503.

A machine learning service 1571 may also utilize micro VMs implemented using the VCS 1503 in some embodiments, e.g., to instantiate relatively short-lived virtual machines to run real-time analytics models. Online/real-time analysis managers 1577 of the MLS 1571 may submit requests to the VCS control plane to obtain virtual machines that can be used to implement algorithms selected from library 1575 in such embodiments. The MLS 1571 may itself be utilized by the VCS control plane in some embodiments—e.g., metrics collected over time may be analyzed using algorithms from library 1575 to determine settings for various tunable parameters of VCS control plane cells, virtualization hosts 1505 and the like.

Methods for Supporting Micro VMs

Figure 16:
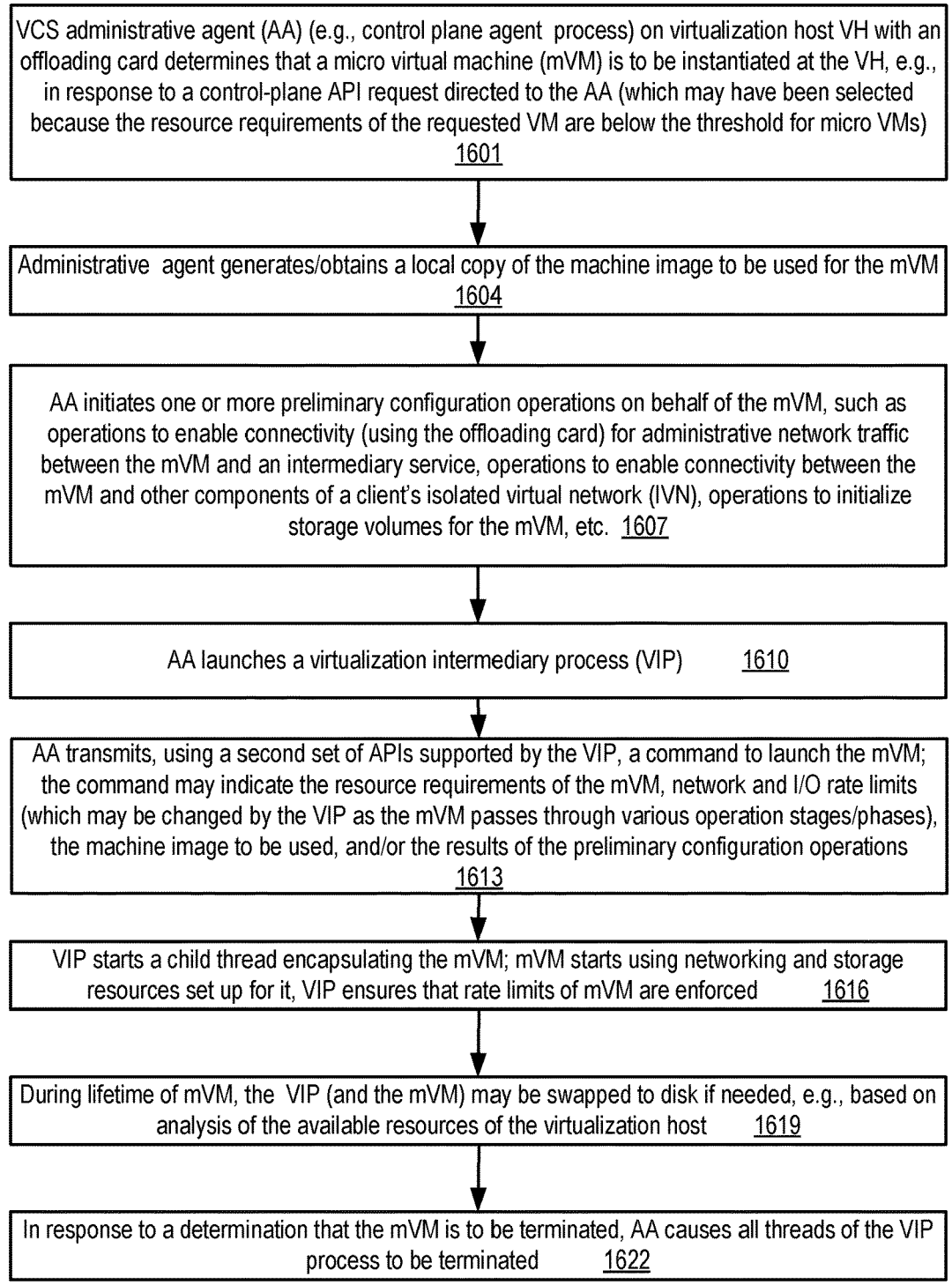
FIG. 16 is a flow diagram illustrating aspects of operations that may be performed at a virtualization host to support micro virtual machines, according to at least some embodiments.

FIG. 16 is a flow diagram illustrating aspects of operations that may be performed at a virtualization host to support micro virtual machines, according to at least some embodiments. A number of hosts or servers may be identified, e.g., by components of a cell-based control plane of a virtualized computing service (VCS), for instantiating virtual machines in response to requests received via programmatic interfaces. An administrative agent (AA) (e.g., similar to the control plane agent (CPA) process described above) may be set up at a given virtualization host, e.g., as part of a stripped down version of an operating system and/or a "bare-metal" compute instance configured at the host. In at least some embodiments, the AA process may be launched as an ordinary operating system process, which can itself be swapped out to persistent storage if needed by the operating system memory management subsystem. In other embodiments, the AA process may be instantiated as a privileged daemon which cannot be swapped out. The virtualization host may comprise one or more virtualization offloading cards in various embodiments, responsible for performing at least a subset of virtualization management operations pertaining to networking or disk I/O.

The AA process may determine that a micro VM is to be instantiated at the virtualization host (element 1601) in the depicted embodiment. In at least some embodiments, such a determination may be made in response to receiving a programmatic request from the VCS control plane in accordance with a first set of internal VCS APIs, which indicates various characteristics of the requested VM, such as resource requirements, networking and storage configuration details, the type of machine/boot image to be used, etc. The requested virtual machine may be designated as a micro VM because its resource requirements fall below a threshold in various embodiments. In at least one embodiment, a VM request may only be directed to an AA of a particular fleet of virtualization hosts if the resources needed for the VM fall below a threshold; that is, separate fleets of virtualization hosts may be set up for micro VMs versus other larger or non-micro VMs. In other embodiments, micro VMs and non-micro VMs may co-exist at the same host.

The AA may generate or obtain a local copy of the machine image to be used for the requested VM in the depicted embodiment (element 1604). In some embodiments, a master copy of the image may already be stored at local storage devices at the host. In other embodiments, at least a portion of the image may be retrieved over a network connection, e.g., from an image repository of the VCS control plane. In one embodiment, common portions of several images corresponding to different micro VM categories may be cached at the virtualization host as discussed earlier in the context of FIG. 11, and only a small portion of the specific image to be used for the micro VM may be retrieved from elsewhere.

In at least some embodiments, before the micro VM is launched, a set of preparatory configuration operations may be performed by the AA (element 1607). Such preparatory operations may, for example, include creating prerequisite software objects that enable connectivity (using an offloading card) for administrative network traffic between the micro VM and an intermediary service such as a software container service which is using the micro VMs to serve its own customers, operations that enable connectivity between the micro VM and other components of a client's isolated virtual network (IVN), and/or operations to initialize one or more storage volumes for the micro VM in various embodiments.

The AA may launch a virtualization intermediary process (VIP) at the virtualization host (element 1610) after the preparatory configuration steps for the micro VM have been successfully completed in the depicted embodiment. (If the preparatory steps fail, in at least some embodiments the request for the micro VM may be rejected by the AA; the request may then, for example, be redirected to some other AA at some other virtualization host selected by the VCS control plane.)

The AA may then submit, using a second set of internal VCS APIs supported by the VIP, a command to launch the micro VM (element 1613). The command may indicate such parameters as the resource requirements of the micro VM, rate limits to be enforced on the micro VM (e.g., the maximum rate of network requests or messages to be accepted from the micro VM or directed to the micro VM, the maximum rate of reads and/or writes directed to persistent storage), the machine image identified for the micro VM, results (such as software network interface device identifiers) of the preliminary configuration operations performed to prepare for the micro VM's launch, and the like. In at least some embodiments, at least some of the rate limits pertaining to usage of a given type of resource may not remain fixed during the lifetime of a micro VM. For example, in an early phase of operation just after the micro VM starts up and is performing various initialization-related operations (such as downloading a container image), in one embodiment a higher rate for some types of operations may be allowed than may be required later on in the lifetime of the micro VM. In effect, in such an embodiment, the VIP may enforce one set of rate limits with respect to one or more categories of resource usage operations during one phase of operation of the micro VM, and a different set of rate limits for the same categories of resource usage operations after the micro VM enters a different phase of operation. The boundaries between the phases may be defined in various ways in different embodiments: e.g., in one embodiment, a determination may be made that an initial phase of relatively high rates of I/O is over when the measured I/O rates remain below a threshold for some time period.

The VIP may start a child thread implementing and encapsulating the micro VM in the depicted embodiment (element 1616). The micro VM may start using the networking and storage resources designated for it, and the VIP may ensure that the rate limits for various phases of the micro VM's operation lifetime are enforced (e.g., using queues for throttling inbound and outbound network and storage requests) in various embodiments.

In at least some embodiments, at one or more stages during the lifetime of the micro VM, at least a portion of the memory being used by the VIP (and its child micro VM) may be swapped out to disk if needed (element 1619), e.g., based on an analysis of available memory resources of the virtualization host, at the initiative of memory management components of the operating system within which the VIP was launched.

In response to a determination that the micro VM is to be terminated (e.g., when an API request for micro VM termination is received at the AA), the AA may cause all threads of the VIP process to be terminated in the depicted embodiment (element 1622). Operations corresponding to elements 1601-1622 may be repeated for each requested micro VM in some embodiments.

Figure 17:
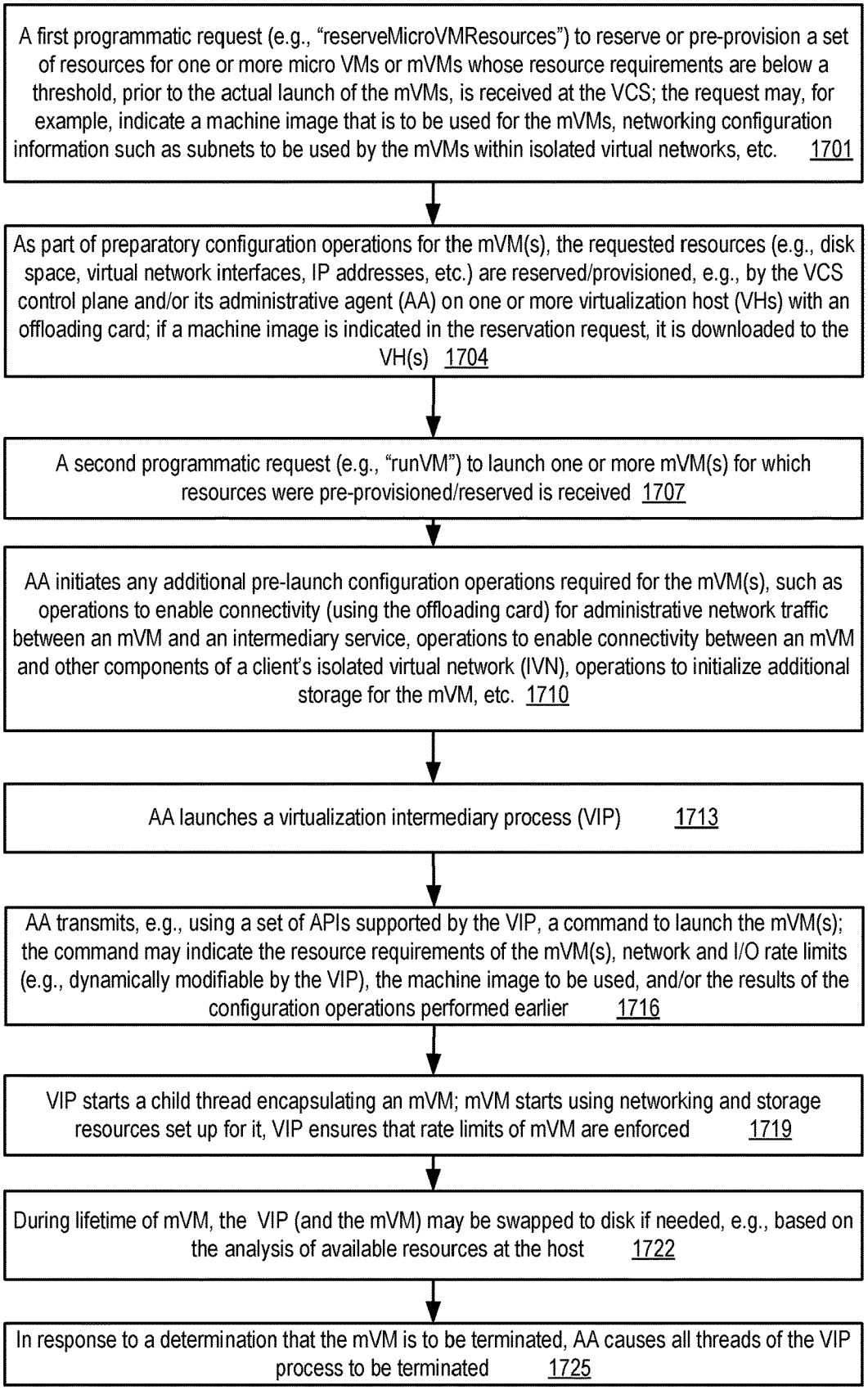
FIG. 17 is a flow diagram illustrating aspects of operations that may be performed at a virtualization host in response to respective types of programmatic requests associated with micro virtual machines, including one or more preparatory operations performed in response to resource reservation requests prior to receiving requests to launch micro virtual machines, according to at least some embodiments.

FIG. 17 is a flow diagram illustrating aspects of operations that may be performed at a virtualization host in response to respective types of programmatic requests associated with micro virtual machines, including one or more preparatory operations performed in response to resource reservation requests prior to receiving requests to launch micro virtual machines, according to at least some embodiments. A number of hosts or servers may be identified, e.g., by components of a cell-based control plane of a virtualized computing service (VCS), for instantiating virtual machines in response to requests received via a plurality of different programmatic interfaces, including interfaces used for requesting resource reservations, as well as requests to start the virtual machines using the reserved resources. An administrative agent (AA) (e.g., similar to the control plane agent (CPA) process described above) may be set up at a given virtualization host, e.g., as part of a stripped down version of an operating system and/or a "bare-metal" compute instance configured at the host. The virtualization host may comprise one or more virtualization offloading cards in various embodiments, responsible for performing at least a subset of virtualization management operations pertaining to networking or disk I/O.

A first programmatic request (e.g., a "reserveMicroVM-Resources" request) to reserve or pre-provision a set of resources for one or more micro VMs, where the resources are not to be actually deployed for launching the micro VMs until a second programmatic request is submitted, may be received at the VCS control plane (element 1701). Such a request may, for example, be submitted by an intermediary service, such as a container service, and/or by other VCS clients, in anticipation of having to launch a large number of micro VMs in the near future. The request may, for example, indicate a particular machine image that is to be used for the micro VMs, an amount of storage that is to be reserved for a given micro VM, one or more virtual network interfaces that are to be set up for a given micro VM within a particular subnet of an isolated virtual network, and so on, in various embodiments. Some of the requested resources (such as disk or other storage space) may be physical, while others may be logical (such as network addresses, virtual network interfaces and the like) in at least some embodiments. In effect, the complete set of configuration operations that need to be performed to launch a micro VM may be split up into at least two subsets in the depicted embodiment: a first subset of preparatory configuration operations (e.g., reserving resources without actually deploying the resources) performed in response to a first type of programmatic request, and a second subset that may be performed when a request to launch the micro VM is processed. Such a division of the configuration operations may help to shorten the launch times for the micro VMs even further (e.g., relative to the launch times achievable if all the configuration operations were performed after the launch request is received) in various embodiments. The particular subset of configuration operations that are performed in response to the reservation request, as opposed to the operations that are performed later in response to the request to utilize the reserved resources to launch the micro VMs, may differ in different embodiments.

As part of the preparatory configuration operations for the micro VM(s), the requested resources (e.g., disk space, virtual network interfaces, IP addresses, etc.) may be reserved and/or provisioned (element 1704), e.g., by the VCS control plane and/or its administrative agent process (AA) at one or more virtualization hosts (VHs) in the depicted embodiment. If a particular machine image is indicated in the reservation request, the image may be copied to one or more VHs (e.g., using the reserved disk space at the VHs) in preparation for the actual launch of the micro VM(s) in various embodiments. In at least some embodiments, metadata indicating that the resources have been reserved and provisioned (indicating for example the specific VHs used) may be stored at the VCS control plane. In one embodiment, at least a portion of a machine image to be used for a micro VM may be stored on an offloaded virtualization management card (OVMC) itself; in such an embodiment, an OVMC may comprise sufficient storage to store machine images and/or other storage objects.

A second programmatic request (e.g., a "runVM") request may be received, indicating that one or more micro VMs for which resources were pre-provisioned or reserved may be received (element 1707) in the depicted embodiment. In at least one embodiment, in response to a resource reservation request, a token indicating that the requested resources have been reserved/acquired/provisioned may be provided to the requester, and such a token may be included in a runVM request to indicate that the resources corresponding to the token should be used for the micro VMs.

In the depicted embodiment, any additional pre-launch configuration operations (operations required or feasible before the micro VM is launched), may be performed by the AA (element 1710). Such preparatory operations may, for example, include creating prerequisite software objects that enable connectivity (using an offloading card) for administrative network traffic between the micro VM and an intermediary service such as a software container service which is using the micro VMs to serve its own customers, operations that enable connectivity between the micro VM and other components of a client's isolated virtual network (IVN), and/or operations to initialize one or more reserved portions of storage for the micro VM in various embodiments. As indicated above, the subset of configuration operations that are performed in response to the second programmatic request, as opposed to the first programmatic request, may differ in different embodiments.

The AA may launch a virtualization intermediary process (VIP) at the virtualization host (element 1713). The AA may then submit, using internal VCS APIs supported by the VIP, a command to launch the micro VM (element 1716). The command may indicate such parameters as the resource requirements of the micro VM, rate limits to be enforced on the micro VM (e.g., the maximum rate of network requests or messages to be accepted from the micro VM or directed to the micro VM, the maximum rate of reads and/or writes directed to persistent storage), the machine image identified for the micro VM, results (such as software network interface device identifiers) of the configuration operations performed to prepare for the micro VM's launch, and the like. The rate limits applied for a given micro VM may be dynamically modified during the lifetime of the micro VM as mentioned earlier.

The VIP may start a child thread implementing and encapsulating the micro VM in the depicted embodiment (element 1719). The micro VM may start using the networking and storage resources designated for it, and the VIP may ensure that the rate limits indicated for various operation phases of the micro VM are enforced (e.g., using queues for throttling inbound and outbound network and storage requests) in various embodiments.

In at least some embodiments, at one or more stages during the lifetime of the micro VM, at least a portion of the memory being used by the VIP (and its child micro VM) may be swapped out to disk if needed (element 1722), e.g., based on an analysis of available memory resources of the virtualization host, at the initiative of memory management components of the operating system within which the VIP was launched.

In response to a determination that the micro VM is to be terminated (e.g., when an API request for micro VM termination is received at the AA), the AA may cause all threads of the VIP process to be terminated in the depicted embodiment (element 1725). Operations corresponding to elements 1701-1725 may be repeated for various requested groups of one or more micro VM in some embodiments.

FIG. 18 is a flow diagram illustrating aspects of operations that may be performed at a virtualized computing service to clone micro virtual machines from snapshots, according to at least some embodiments. After needed configuration operations of the kind discussed above are performed, a micro VM (mVM1) may be launched at a virtualization host with a virtualization offloading card in the depicted embodiment (element 1801). For example, using the type of process architecture discussed above, mVM1 may be implemented using a child thread of a virtualization intermediary process (VIP) to which an API call is directed from a VCS control plane administrative agent in some embodiments. The configuration operations performed prior to launching mVM1 may be performed in response to one or more programmatic requests in some embodiments. For example, in one embodiment, some operations may be performed in response to an invocation of a pre-launch reservation request API, while others may be performed when the request to launch mVM1 is received; in other embodiments, separate reservation requests may not be required.

In some embodiments, at least a portion of the configuration information of mVM1 (e.g., various aspects of storage and/or networking settings, initial rate limits, and the like) may be saved as a snapshot (element 1804), e.g., in response to a "createVMSnapshot" request received at the VCS control plane via a programmatic interface. Such a request may, for example, be submitted by a client of the VCS in anticipation of needing to launch a large number of similarly-configured micro VMs ("clones" of mVM1) in some embodiments. The snapshot may, for example, be stored at a repository managed by the VCS control plane in some embodiments, at a storage device other than the local storage of the virtualization host where mVM1 was launched.

One or more additional preparatory configuration operations (e.g., to set up software devices etc.) for clones of mVM1 may optionally be performed at one or more virtualization hosts in the depicted embodiment (element 1807). In some embodiments, such operations may be performed in response to a "prepareToClone" request received via a programmatic interface. In at least one embodiment, such configuration operations may not be required.

In response to a request to clone mVM1 (e.g., a "cloneVM" API call), a respective VIP process may start up a child thread implementing the requested clone, using the saved snapshot and/or the results of the additional preparatory configuration operations (if any) in the depicted embodiment (element 1810). In some embodiments, the snapshot may comprise the configuration of the VIP process as a whole, not just the configuration of the child thread implementing mVM1.

It is noted that in various embodiments, some of the operations shown in FIG. 16, FIG. 17 and/or FIG. 18 may be implemented in a different order than that shown in the figure, or may be performed in parallel rather than sequentially. Additionally, some of the operations shown in FIG. 16, FIG. 17 and/or FIG. 18 may not be required in one or more implementations.

Use Cases

The techniques described above, involving the use of a variety of techniques to support large numbers of virtual machines per host at a network-accessible virtualized computing service may be extremely beneficial for a number of reasons in various scenarios. Many types of computations performed at a virtualized computing service on behalf of other intermediary services (e.g., services that support software containers, or services that allow customers to submit programs to be executed at resources selected by the service instead of the customer) and/or on behalf of individual clients may require only a limited set of resources, and/or may have fairly short lifespans. The overhead associated with setting up traditional virtual machines, which may assume longer lifespans and larger resource needs, may not be cost-effective for such small or micro VMs. Techniques that involve the installation of stripped down versions of operating systems at virtualization hosts, the use of virtualization offloading cards (both of which would enable a larger fraction of the host's resources available for client-requested virtual machines), fine-grained multiplexing/sharing of software and hardware networking and storage devices among virtual machines, the use of swappable processes to instantiate the virtual machines, and the like may in combination enable large numbers (e.g., tens of thousands) of virtual machines to be set up at a single host without affecting the overall VM performance perceived by the clients. Substantial savings in terms of the total CPU, memory and storage needed to support the micro VMs, relative to conventional virtualization techniques, may be obtained.

Illustrative Computer System

Figure 19:
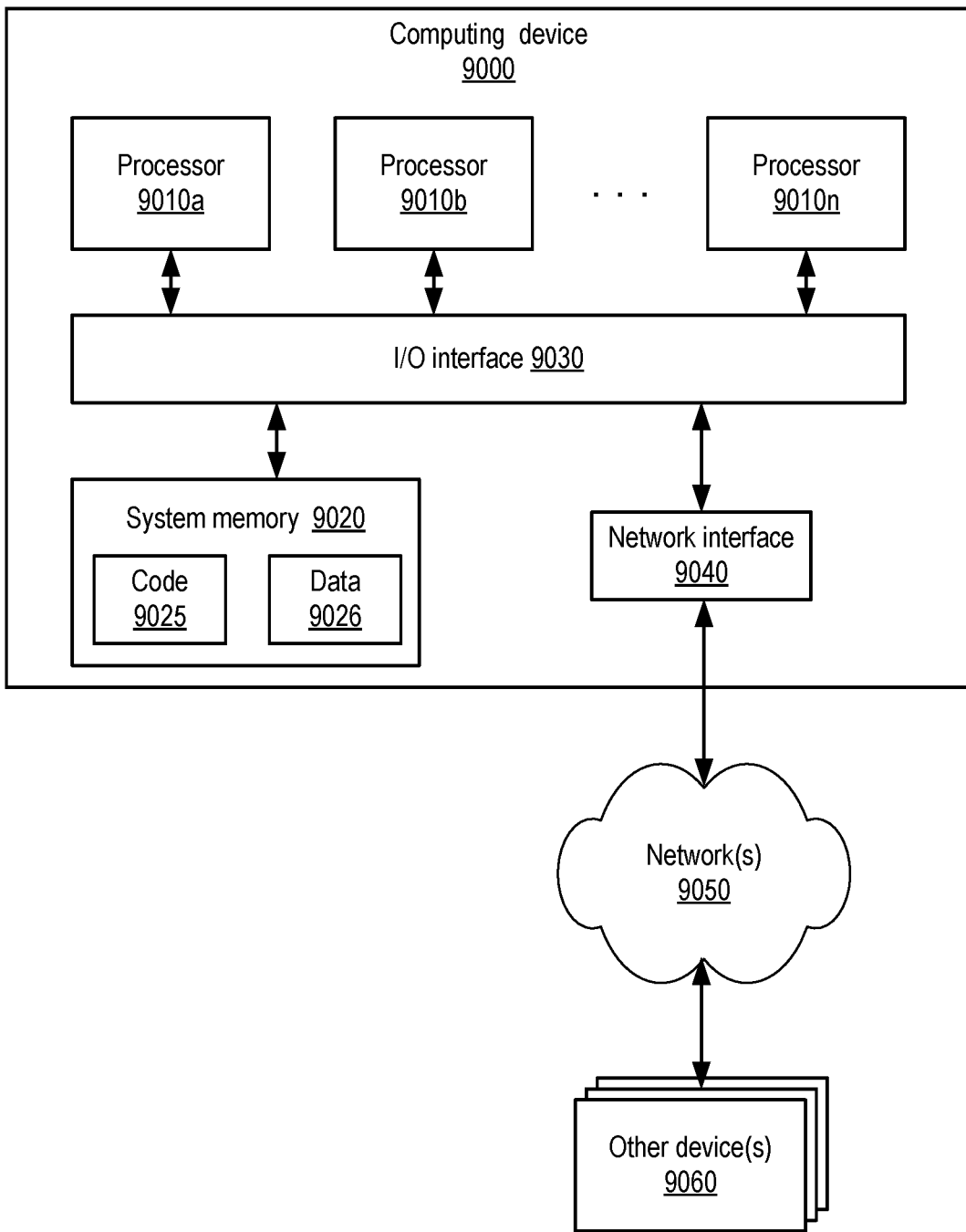
FIG. 19 is a block diagram illustrating an example computing device that may be used in at least some embodiments.

In at least some embodiments, a server that implements a portion or all of one or more of the technologies described herein, including the various components of the data plane and/or control plane of a virtualized computing service, may include a general-purpose computer system that includes or is configured to access one or more computer-accessible media. FIG. 19 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG.

1 through FIG. 18, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 18 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A virtualization host of a network-accessible computing service, comprising:
   one or more processors;
   a memory; and
   one or more virtualization offloading cards including a first virtualization offloading card;
   wherein the memory comprises instructions that when executed on one or more processors cause an administrative agent process to:
      determine, based at least in part on a request received via a first programmatic interface from a control-plane component of the network-accessible computing service, that a virtual machine is to be instantiated on behalf of a client, wherein the request is directed to the virtualization host based at least in part on a determination that a resource requirement of the virtual machine is below a threshold for classification of the virtual machine as a micro virtual machine;
      obtain a copy of a machine image to be used for the virtual machine;
      initiate one or more configuration operations on behalf of the virtual machine, including (a) a first configuration operation to enable connectivity for administrative network traffic associated with the virtual machine and (b) a second configuration operation to enable connectivity for non-administrative network traffic associated with the virtual machine, wherein at least one configuration operation of the first and second configuration operations is performed using the first virtualization offloading card; and
      cause, using a command issued via a second programmatic interface, wherein the command indicates (a) the resource requirement, (b) the copy of the machine image, and (c) a result of the one or more configuration operations, an intermediary process to launch a child thread implementing the virtual machine, wherein the intermediary process can be swapped to persistent storage based at least in part on an analysis of resources of the virtualization host.

2. The virtualization host as recited in claim 1, wherein at least one configuration operation of the first and second configuration operations comprises:
   programmatically associating a child virtual network interface to a parent virtual network interface, wherein the child virtual network interface is designated for use by the virtual machine, wherein the parent virtual network interface has a corresponding software PCI (peripheral connect interface) device object, and wherein the child virtual network interface does not have a corresponding software PCI (peripheral connect interface) device object.

3. The virtualization host as recited in claim 1, wherein at least one configuration operation of the first and second configuration operations comprises:
   performing one or more Port Address Translation (PAT) configuration operations on behalf of the virtual machine.

4. The virtualization host as recited in claim 1, wherein the one or more configuration operations include an operation to configure a storage object to be accessed from the virtual machine, using one or more of: (a) a locally attached storage device of the virtualization host, or (b) a network-attached storage device.

5. The virtualization host as recited in claim 1, wherein the first virtualization offloading card is coupled to the one or more processors via a peripheral bus.

6. A method, comprising:
performing, by an administrative agent at a virtualization host of a network-accessible virtualized computing service of a provider network, based at least in part on a first programmatic request, one or more preparatory configuration operations for at least one virtual machine to be instantiated at the virtualization host;
in response to determining, by the administrative agent, based at least in part on a second programmatic request, that a first virtual machine is to be instantiated at the virtualization host:
    instantiating, by the administrative agent, a virtualization intermediary process of the virtualization host; and
    instantiating, by the virtualization intermediary process, one or more execution threads of the virtualization intermediary process to implement the first virtual machine.

7. The method as recited in claim 6, wherein the one or more preparatory configuration operations comprise one or more of: (a) reserving storage space at the virtualization host, (b) downloading, to the virtualization host, a machine image to be used for the first virtual machine, or (c) provisioning, within a particular subnet of an isolated virtual network, a virtual network interface to be used by the first virtual machine.

8. The method as recited in claim 6, further comprising:
configuring a parent virtual network interface at the virtualization host, wherein configuring the parent virtual network interface comprises creating a software PCI (peripheral connect interface) device object; and
programmatically attaching, by the administrative agent, a child virtual network interface to the parent virtual network interface, wherein the child virtual network interface is designated for use by the first virtual machine, and wherein the child virtual network interface does not have an associated software PCI device object.

9. The method as recited in claim 6, further comprising:
configuring a parent virtual network interface at the virtualization host; and
programmatically attaching a child virtual network interface to the parent virtual network interface; and
configuring, for use by the first virtual machine, a tap (link layer simulation) device associated with a bridge in a first network namespace dedicated for port address translation, wherein the bridge is programmatically connected to the child virtual network interface, wherein a DHCP (Dynamic Host Configuration Protocol) server instantiated at the virtualization host assigns respective network addresses in the first network namespace to individual ones of a plurality of virtual machines including the first virtual machine.

10. The method as recited in claim 6, further comprising:
assigning at least a first network address to the first virtual machine, wherein the first network address is within a range of network addresses of an isolated virtual network established at the virtualized computing service on behalf of a client.

11. The method as recited in claim 6, further comprising:
assigning, for shared use by the first virtual machine, a particular child virtual network interface programmatically associated with a parent virtual network interface configured at the virtualization host, wherein the particular child virtual network interface is also assigned to a second virtual machine.

12. The method as recited in claim 6, further comprising:
configuring, by the administrative agent, a local communication channel for messages between the first virtual machine and a second virtual machine instantiated at the virtualization host, wherein a transfer of a message on the local communication channel does not utilize a physical network interface of the virtualization host.

13. The method as recited in claim 6, further comprising:
determining a resource over-subscription setting for the virtualization host, wherein the resource over-subscription setting is indicated by a client of the virtualized computing service on whose behalf the first virtual machine is instantiated;
causing, in accordance with the resource over-subscription setting, a plurality of virtual machines to be instantiated at the virtualization host, such that the aggregate memory requirements of the plurality of virtual machines exceed the size of a memory of the virtualization host; and
swapping to persistent storage, in response to detecting that an amount of available memory at the virtualization host is below a threshold, at least a portion of the memory being used by the first virtual machine.

14. The method as recited in claim 6, further comprising:
terminating, by the administrative agent, the virtualization intermediary process in response to determining that the first virtual machine is to be terminated.

15. The method as recited in claim 6, further comprising:
selecting, from a plurality of storage device types supported at the virtualized computing service for virtual machines, at least one type of storage device from which storage is to be assigned to the first virtual machine, wherein the plurality of storage device types comprises: (a) locally-attached rotating disk devices, (b) locally-attached solid state devices, (c) network-attachable block device volumes managed by the virtualized computing service, (d) network-attachable block device volumes managed by a service other than the virtualized computing service, or (d) object storage devices enabling access to storage via a web services interface;
allocating storage for the first virtual machine from a storage device of a selected storage device type.

16. The method as recited in claim 6, further comprising:
assigning, based at least in part on an analysis of a parameter of at least one programmatic request of the first or second programmatic requests:
    a portion of a first shared storage area to the first virtual machine, wherein the first portion is also assigned to one or more other virtual machines of the virtualization host; and
    a portion of a private storage area to the first virtual machine.

17. A non-transitory computer-accessible storage medium storing program instructions that when executed on one or more processors cause the one or more processors to:
determine, based at least in part on one or more programmatic requests received via one or more programmatic interfaces, that a first virtual machine is to be instantiated at a virtualization host of a network-accessible virtualized computing service;
initiate, by an administrative agent at the virtualization host, one or more configuration operations on behalf of the first virtual machine, including a first configuration operation to enable connectivity for at least a portion of network traffic associated with the first virtual machine, wherein the first configuration operation is performed at least in part using a first virtualization offloading card of the virtualization host; and cause, by the administrative agent using a command issued via a second programmatic interface, a virtualization intermediary process of the virtualization host to launch one or more execution threads of the virtualization intermediary process to implement the first virtual machine, wherein the virtualization intermediary process can be swapped to persistent storage based at least in part on an analysis of resources of the virtualization host.

18. The non-transitory computer-accessible storage medium as recited in claim 17, wherein the one or more programmatic requests include a first request and a second request, wherein the first request comprises an indication of a set of resources to be reserved for the first virtual machine prior to the launch of the one or more execution threads, wherein the set of resources comprises one or more of (a) a storage resource or (b) a network resource, and wherein the administrative agent causes of the launch of the one or more execution threads in response to the second request.

19. The non-transitory computer-accessible storage medium as recited in claim 17, wherein the first configuration operation comprises a Port Address Translation configuration operation.

20. The non-transitory computer-accessible storage medium as recited in claim 17, wherein the instructions when executed on the one or more processors cause the one or more processors to:

cache, at a local storage device of the virtualization host, a first portion of a first machine image, and a second portion of a second machine image, wherein the first machine image corresponds to a first category of virtual machines and the second machine image corresponds to a second category of virtual machines;

determine, based at least in part on the request, that the first virtual machine belongs to the first category of virtual machines;

obtain a remainder portion of the first machine image;

combine the remainder portion with the first portion to generate a local copy of the first machine image; and cause the local copy of the first machine image to be used to launch the first virtual machine.

21. The non-transitory computer-accessible storage medium as recited in claim 17, wherein the instructions when executed on the one or more processors cause the one or more processors to:

cause a snapshot of a configuration of the first virtual machine to be stored; and in response to a virtual machine cloning request, cause another virtualization intermediary process to launch, using at least the snapshot, one or more execution threads of the other virtualization intermediary process to implement a second virtual machine.

22. The non-transitory computer-accessible storage medium as recited in claim 17, wherein the instructions when executed on the one or more processors cause the one or more processors to:

enforce, by the virtualization intermediary process, during a first phase of operation of the first virtual machine, a first set of rate limits with respect to one or more categories of resource usage operations of the first virtual machine;

in response to determining, by the virtualization intermediary process, that the first virtual machine has entered a second phase of operation, enforce, by the virtualization intermediary process, a second set of rate limits with respect to the one or more categories of resource usage operations of the first virtual machine.

* * * * *